(12) United States Patent
Takeda et al.

(10) Patent No.: US 11,060,637 B2
(45) Date of Patent: Jul. 13, 2021

(54) COUPLING MEMBER, FLUID-DEVICE CONNECTING JIG, AND FLUID-DEVICE CONNECTING STRUCTURE

(71) Applicant: CKD CORPORATION, Komaki (JP)

(72) Inventors: Hideyuki Takeda, Kasugai (JP); Hiroki Iwata, Kasugai (JP); Hiroto Yasue, Gifu (JP); Yasunori Nishimura, Kasugai (JP)

(73) Assignee: CKD CORPORATION, Komaki (JP)

( * ) Notice: Subject to any disclaimer, the term of this patent is extended or adjusted under 35 U.S.C. 154(b) by 731 days.

(21) Appl. No.: 15/807,281

(22) Filed: Nov. 8, 2017

(65) Prior Publication Data

US 2018/0156362 A1    Jun. 7, 2018

(30) Foreign Application Priority Data

Dec. 1, 2016  (JP) .............................. JP2016-233961
Nov. 1, 2017  (JP) .............................. JP2017-211516

(51) Int. Cl.
*F16L 43/02*    (2006.01)
*F16L 3/10*    (2006.01)
(Continued)

(52) U.S. Cl.
CPC ............ *F16L 3/1075* (2013.01); *B25B 27/10* (2013.01); *F16L 21/06* (2013.01); *F16L 23/032* (2013.01); *F16L 23/06* (2013.01); *F16L 23/162* (2013.01); *F16L 43/02* (2013.01); *F16L 47/145* (2013.01); *B25B 27/16* (2013.01); *F16L 3/1233* (2013.01); *F16L 21/08* (2013.01); *F16L 23/167* (2013.01)

(58) Field of Classification Search
CPC ....... F16L 23/032; F16L 23/06; F16L 47/145; F16L 23/04; F16L 3/1075; F16L 23/10; F16L 23/18; F16L 23/22; F16L 43/02; F16L 23/162; F16L 21/06; F16L 23/003; F16L 3/1233
See application file for complete search history.

(56) References Cited

U.S. PATENT DOCUMENTS

| | | | | |
|---|---|---|---|---|
| 2,775,806 A | * | 1/1957 | Love .................. | F16L 23/06 24/271 |
| 8,033,579 B2 | * | 10/2011 | Takeda ................ | F16L 23/06 285/367 |
| 2009/0091125 A1 | * | 4/2009 | Takeda ................ | B25B 27/10 285/88 |

FOREIGN PATENT DOCUMENTS

| | | |
|---|---|---|
| CN | 101403454 A | 4/2009 |
| JP | 4575973 B2 | 11/2010 |
| JP | 5134573 B2 | 1/2013 |

\* cited by examiner

*Primary Examiner* — Matthew Troutman
*Assistant Examiner* — James A Linford
(74) *Attorney, Agent, or Firm* — Oliff PLC

(57) ABSTRACT

A fluid-device connecting structure includes a first fluid device having a first connection part, a second fluid device having a second connection part, an annular seal member to connect the first and second connection parts, and a coupling member to keep the first and second connection parts in a connected state. The coupling member includes a first coupling segment and a second coupling segment, each including at one end a first hinge part or a second hinge part. The first and second connection parts each have a cylindrical outer shape. The first coupling segment has a U-like shape having an opening and surrounds the first and second connection parts over a range more than 180 degrees of an entire circumference of each of the first and second connection parts.

15 Claims, 36 Drawing Sheets

(51) Int. Cl.
*F16L 23/16* (2006.01)
*F16L 21/06* (2006.01)
*F16L 23/032* (2006.01)
*F16L 23/06* (2006.01)
*B25B 27/10* (2006.01)
*F16L 47/14* (2006.01)
B25B 27/16 (2006.01)
F16L 21/08 (2006.01)
F16L 3/123 (2006.01)

COUPLING MEMBER, FLUID-DEVICE CONNECTING JIG, AND FLUID-DEVICE CONNECTING STRUCTURE

CROSS-REFERENCE TO RELATED APPLICATIONS

This application is based upon and claims the benefit of priority from the prior Japanese Patent Applications No. 2016-233961 filed on Dec. 1, 2016 and No. 2017-211516 filed on Nov. 1, 2017, the entire contents of which are incorporated herein by reference.

BACKGROUND

Technical Field

This disclosure relates to a coupling member to be used in a fluid-device connecting structure including a first fluid device having a first connection part, a second fluid device having a second connection part, an annular seal member for connecting the first connection part and the second connection part, and a coupling member for maintaining the first and second connection parts in a connected state.

Related Art

For control of chemical liquid or solution to be used in a semiconductor manufacturing process, a liquid crystal producing process, or another process, there have conventionally been used various kinds of fluid devices: for example, valves such as a flow control valve and an on/off valve; filters; sensors such as a pressure sensor and a flow sensor; and pipe blocks such as a joint block and a flow passage block. In recent years, those fluid devices are unitized by directly connecting respective connection parts by use of a coupling member in order to reduce the size of each device.

FIG. 33 is a cross-sectional view of a coupling member 106 in a conventional fluid-device connecting structure, which is in a normal use state. FIG. 34 is a cross-sectional view of the coupling member 106 in the conventional fluid-device connecting structure, which is in a further tightened (retightened) state.

The coupling member 106 includes a first coupling segment 107 and a second coupling segment 108 with their both ends engaged with each other as shown in FIG. 33. One end of the first coupling segment 107b and one end of the second coupling segment 108 (first engagement portions) are rotatably engaged with each other through a pivot shaft 111. On the other hand, the other ends of the first coupling segment 107 and the second coupling segment 108 (second engagement portions) are engaged with each other in such a manner that a claw 108e protruding from a first extended portion 108c of the second coupling segment 108 is inserted by elastic deformation into an insertion hole 107e formed in a second extended portion 107c of the first coupling segment 107, and then the claw 108e is restored to lock in the second extended portion 107c, so that this connected state is maintained. This connected state is a normal use state where the connection parts are connected by the coupling member 106.

The connection parts, an annular seal member, and the first coupling segment 107 and the second coupling segment 108 are made of resin, or plastic. Thus, for example, if the connection parts are exposed alternately to abnormally high temperature chemical liquid and abnormally low temperature pure water for a long term, the connection parts may be creep-deformed, leading to decreased sealing strength. Such a decreased sealing strength may cause leakage of liquid. In this emergency situation, retightening of the coupling member 106 is performed.

Specifically, a retightening member 110 is attached to the coupling member 106 to bring the first coupling segment 107 and the second coupling segment 108 close to each other to draw the connection parts toward each other to enhance sealing strength.

The retightening member 110 is inserted in an insertion hole 107d of the first coupling segment 107 and tightened in a bolt hole 108d of the second coupling segment 108, thereby drawing the first coupling segment 107 and the second coupling segment 108 to bring the connection parts close to each other. Thus, the coupling member 106 can enhance the sealing strength by tightening using the retightening member 110.

RELATED ART DOCUMENTS

Patent Documents

Patent Document 1: Japanese Patent No. 5134573
Patent Document 2: Japanese Patent No. 4575973

SUMMARY

Technical Problems

However, the conventional coupling member 106 has the following problems.

The coupling member 106 is provided, as shown in FIG. 33, with the pivot shaft 111 unitizing the first coupling segment 107 and the second coupling segment 108, the first extended portion 108c and the second extended portion 107c each extending radially outwardly to maintain a closed state of the coupling member 106. Thus, the entire size of the coupling member 106 is large.

Alternatively, since the second engagement portions for retightening as a safety mechanism are provided to extend outward in a radial direction of the coupling member 106, the coupling member 106 itself is large in size. Thus, wide space is needed for the work to mount this coupling member 106.

In a case where many fluid devices are arranged in parallel on an installation surface 300, as shown in FIG. 35, the work space for a fluid device, particularly a central one, is limited to an opposite side to the installation surface 300. Thus, the work to close a target coupling member 106 for the central fluid device by bringing the first coupling segment 107 and the second coupling segment 108 thereof close to each other could not be performed due to the coupling members 106 located on both sides of the target coupling member 106. Even if the coupling member 106 is mounted, an operator has to insert his hand from an opposite direction to an insertion direction and bring the coupling segments 107 and 108 in the normal use state with his hand. Therefore, the claw 108e could not be engaged with the insertion hole 107e. Furthermore, the work to retighten the coupling member 106 could not be performed in a narrow space where an operator's hand is not allowed to insert. This causes a problem with workability.

The present disclosure has been made to address the above problems and has a purpose to provide a fluid-device connecting structure which can be located in a narrow space and can provide good workability.

Means of Solving the Problems

To achieve the above-mentioned purpose, one aspect of the present disclosure provides a coupling member to be used for a fluid-device connecting structure comprising: a first fluid device having a first connection part; a second fluid device having a second connection part; an annular seal member placed between the first connection part and the second connection part; and the coupling member for coupling the first connection part and the second connection part through the annular seal member, wherein the coupling member includes a first coupling segment and a second coupling segment, each having a rotational joint part at a first end, the first connection part and the second connection part each have a cylindrical outer shape, and the first coupling segment has a U-like shape having an opening and is engageable with the second coupling segment at points spaced more than 180 degrees of an entire circumference of each of the first connection part and the second connection part.

According to the coupling member configured as above, the following advantageous effects can be achieved. Specifically, the first coupling segment has a U-like having an opening at one side. The first coupling segment is engaged with the second coupling segment so as to circumferentially surround the first connection part and the second connection part over a range more than 180 degrees of their entire circumference. No engagement portion is provided outside the coupling member in its radial direction. Thus, the coupling member itself is compact in size. Accordingly, the coupling member can be mounted in even such an insufficient space because many fluid devices are located in parallel and thus pipes or wall surfaces are close to each other. This can achieve good workability.

Another aspect of the present disclosure provides a fluid-device connecting jig to be used in the aforementioned coupling member, wherein the first coupling segment is provided, on its outer peripheral surface, with a second jig-catching part, the second coupling segment is provided, on its outer peripheral surface, with a first jig-catching part, and the fluid-device connecting jig includes a common hooking part engageable with the first jig-catching part, and a first-lock-position hooking part and a second-lock-position hooking part each engageable with the second jig-catching part. Accordingly, the first coupling segment and the second coupling segment can be placed in a connection state changeable between the first lock position and the second lock position.

Further, another aspect of the present disclosure provides a fluid-device connecting jig to be used in the aforementioned coupling member, wherein the fluid-device connecting jig is inserted from same direction as a direction of mounting the coupling member onto the first connection part and the second connection part to engage the first coupling segment and the second coupling segment. This configuration enables a one-way work, which can be easily performed with good workability even in a narrow space where many fluid devices are installed in parallel.

Still further, another aspect of the present disclosure provides a fluid-device connecting jig to be used in the aforementioned coupling member, wherein when the fluid-device connecting jig remains attached to the coupling member, the fluid-device connecting jig indicates a retightened state of the coupling member. Accordingly, the retightened state of the coupling member can be easily ascertained from its appearance. This enables an operator to find and address a fluid device with the coupling member in a retightened state at a glance during maintenance with good workability.

Another aspect of the present disclosure provides the fluid-device connecting structure including the aforementioned coupling member.

DETAILED DESCRIPTION OF THE EXEMPLARY EMBODIMENTS

Figure 5:
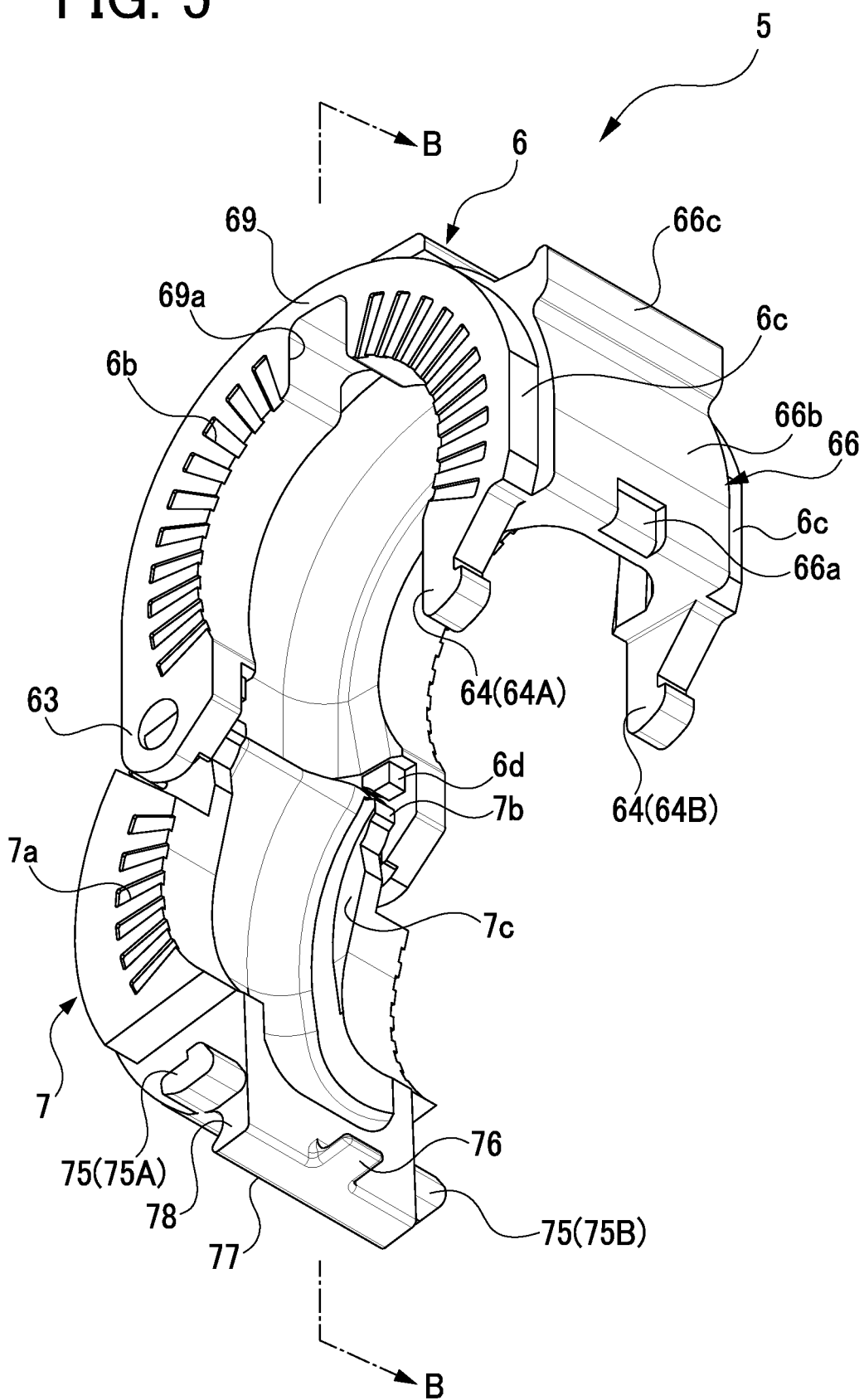
FIG. 5 is a perspective view of the coupling member before engagement.
Figure 6:
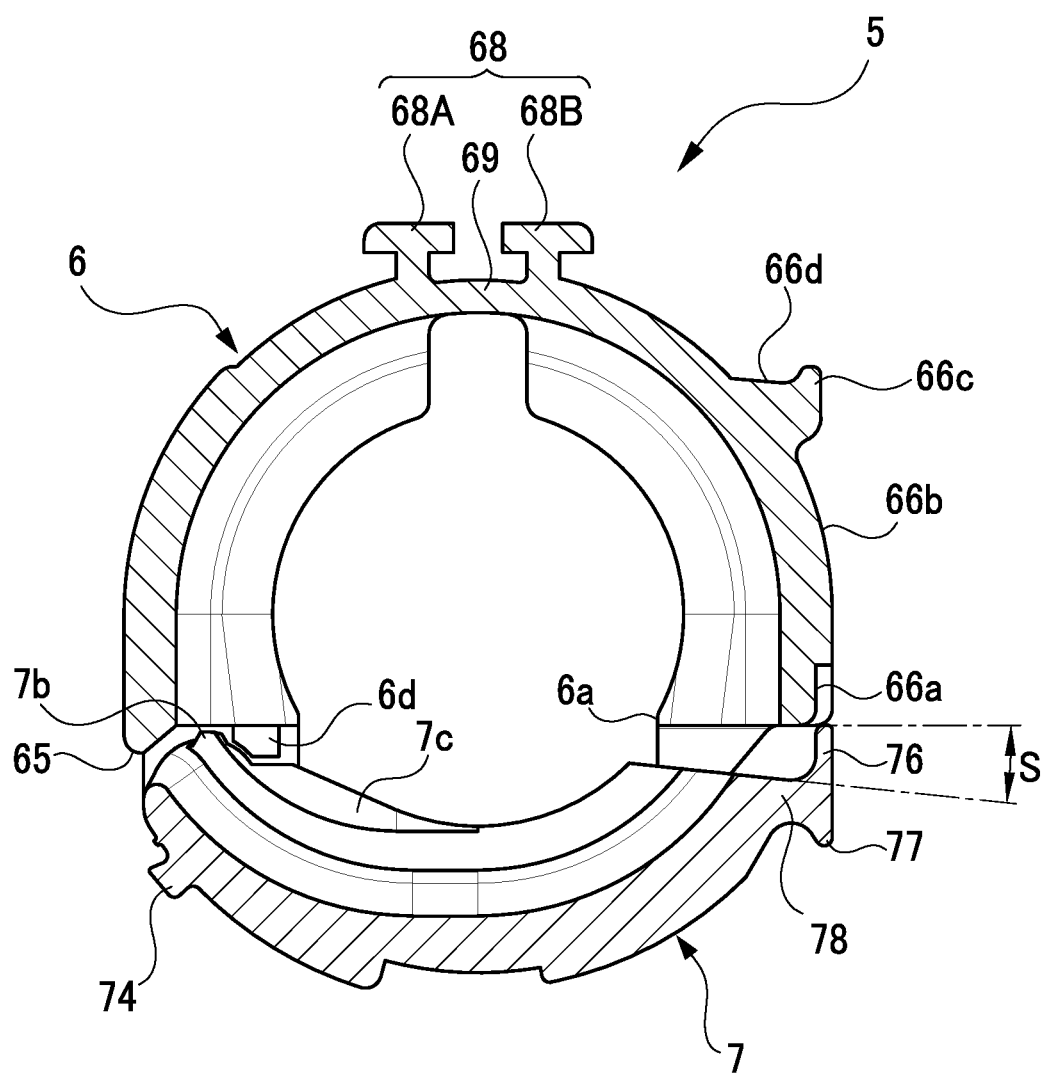
FIG. 6 is a cross-sectional view taken along a line A-A in FIG. 1.
Figure 7:
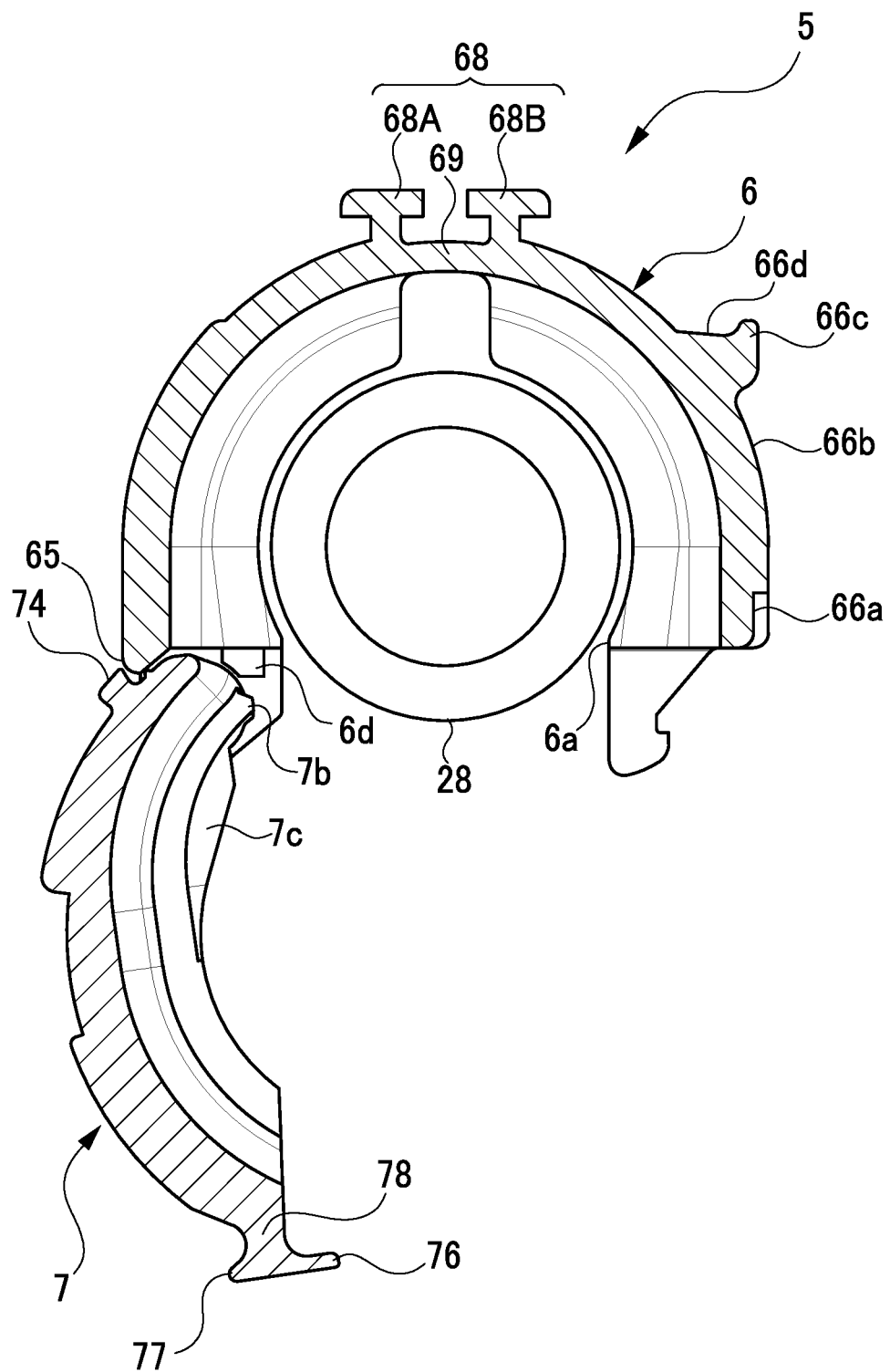
FIG. 7 is a cross-sectional view taken along a line B-B in FIG. 5.
Figure 8:
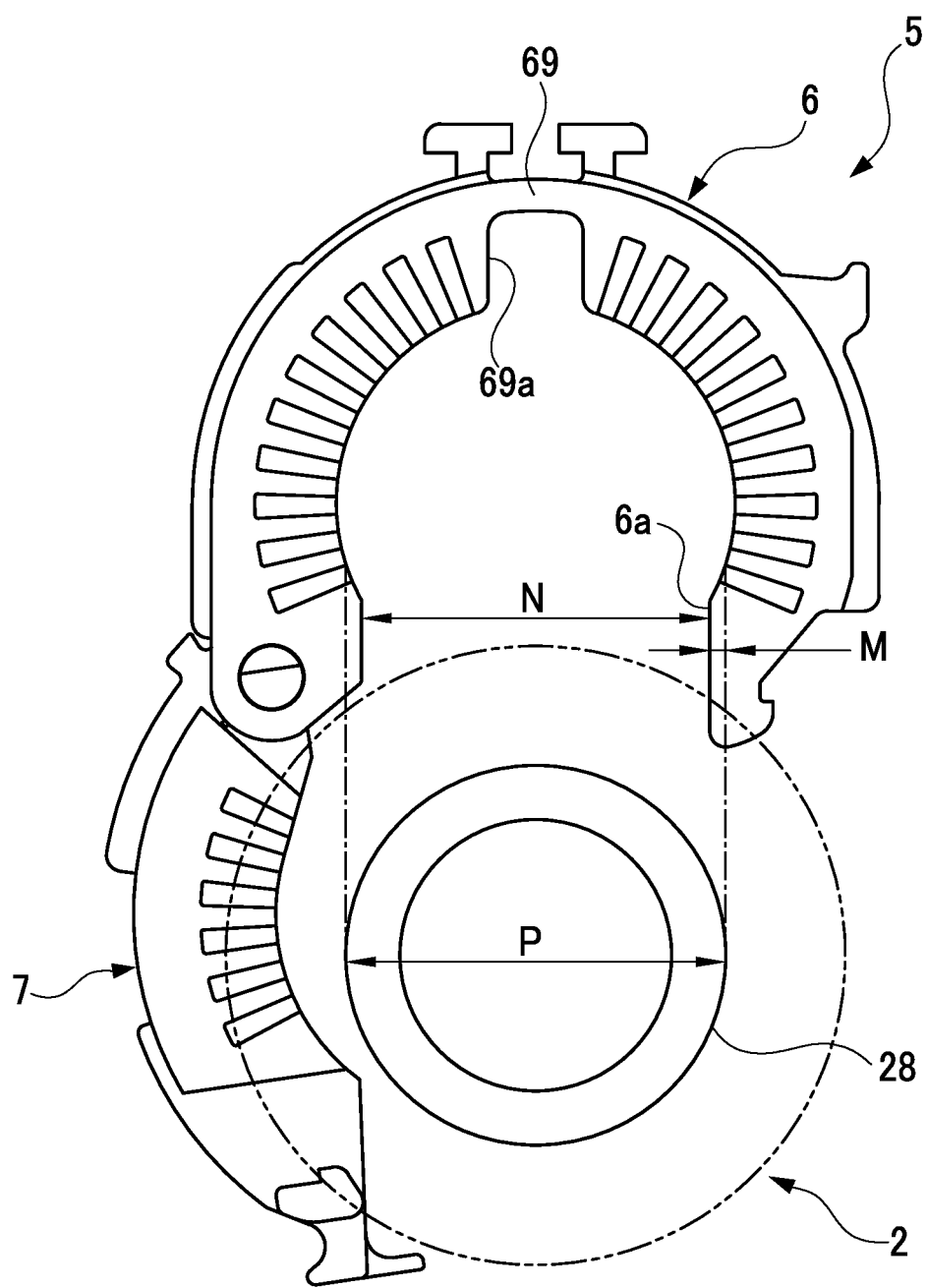
FIG. 8 is a view showing a relationship between a coupling member and a fluid device.
Figure 9:
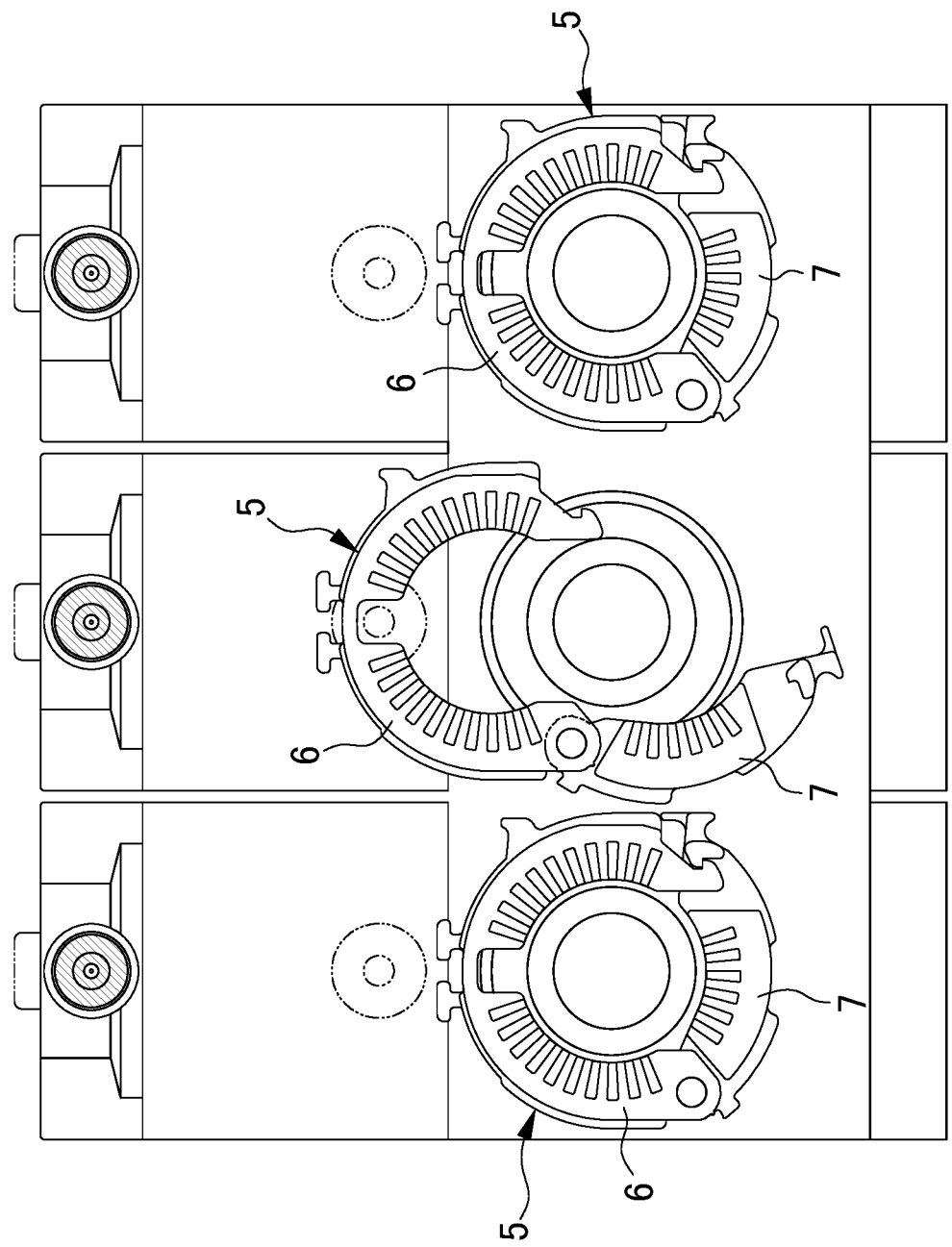
FIG. 9 is a front view of a coupling member in the process of being mounted onto one of fluid devices placed in parallel.

A detailed description of an embodiment of a coupling member, a fluid-device connecting jig, and a fluid-device connecting structure which are ones of typical embodiments of this disclosure will now be given referring to the accompanying drawings. The fluid-device connecting structure 1 will be first described in detail below. FIGS. 1 to 4 are perspective views showing a coupling member 5 in a first lock position seen from different angles. FIG. 5 is a perspective view of the coupling member 5 before engagement. FIG. 6 is a cross-sectional view taken along a line A-A in FIG. 1. FIG. 7 is a cross-sectional view taken along a line B-B in FIG. 5. FIG. 8 shows a relationship between the coupling member 5 and a first fluid device 2. FIG. 9 is a front view of the coupling member 5 in the process of being mounted onto one of fluid devices placed in parallel.

Figure 12:
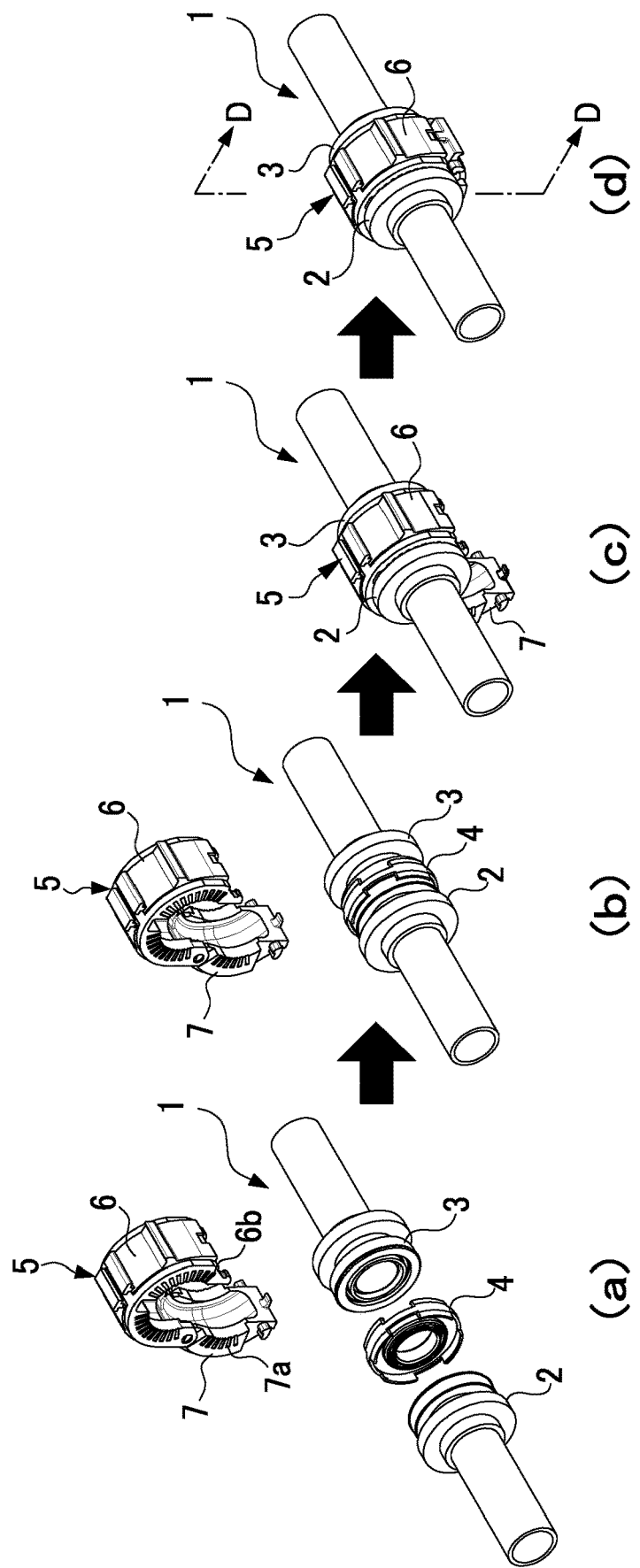
FIG. 12 illustrates how to connect fluid devices with a coupling member, (a) showing an exploded view of a first fluid device, a second fluid device, and an annular seal member, (b) showing the first fluid device, second fluid device, and annular seal member connected to each other, (c) showing the coupling member mounted on the first fluid device, the second fluid device, and the annular seal member in the connected state, and (d) showing the coupling member placed in a first lock position with respect to the first fluid device, the second fluid device, and the annular seal member held in the connected state.

FIG. 12 illustrates how to connect fluid devices 2 and 3 with the coupling member 5, (a) showing an exploded view of the first fluid device 2, a second fluid device 3, and an annular seal member 4, (b) showing those first fluid device 2, second fluid device 3, and annular seal member 4 connected to each other, (c) showing the coupling member 5 mounted on the first fluid device 2, second fluid device 3, and annular seal member 4 in the connected state, and (d) showing the coupling member 5 placed in a first lock position with respect to the first fluid device 2, second fluid device 3, and annular seal member 4 in the connected state.

Figure 13:
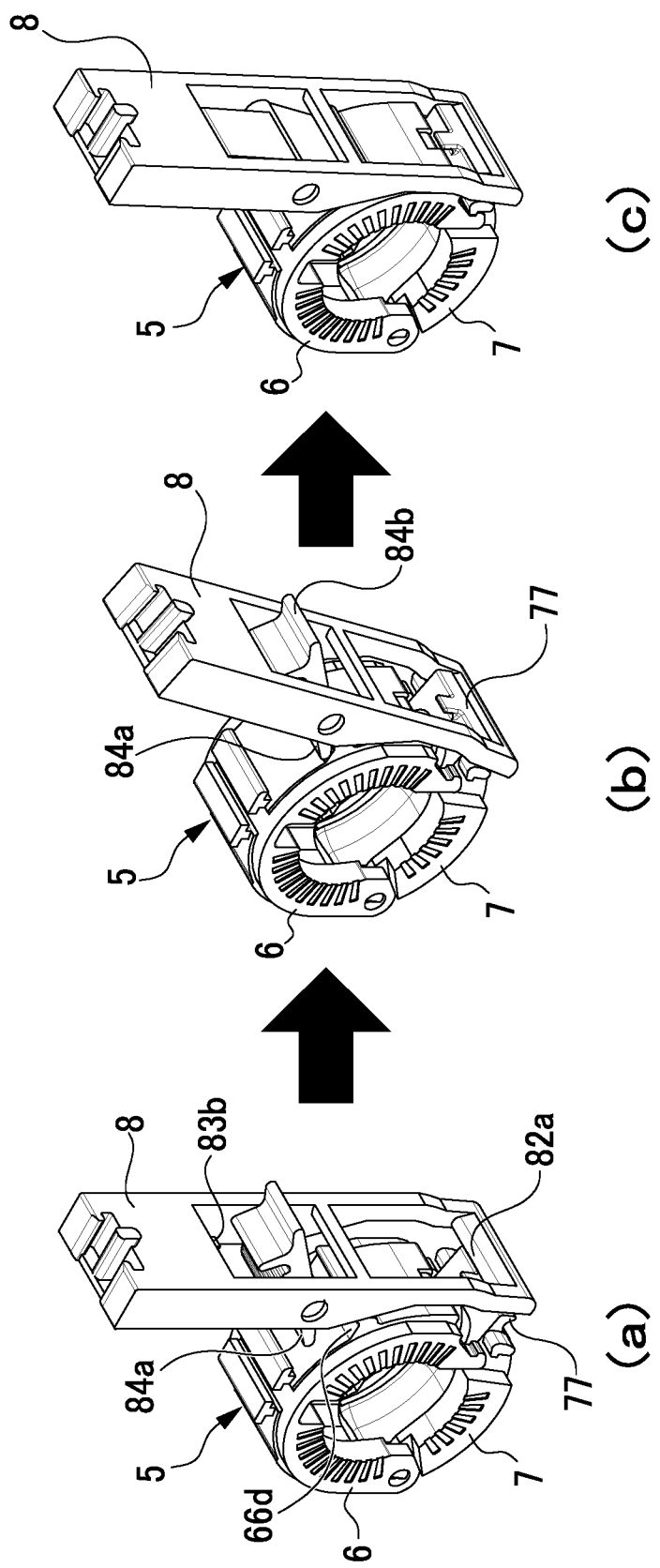
FIG. 13 illustrates how to bring the coupling member into an engagement state using a jig, (a) showing the coupling member before engagement, (b) showing the coupling member in the process of engagement, and (c) showing the coupling member placed in the first lock position by the jig.
Figure 14:
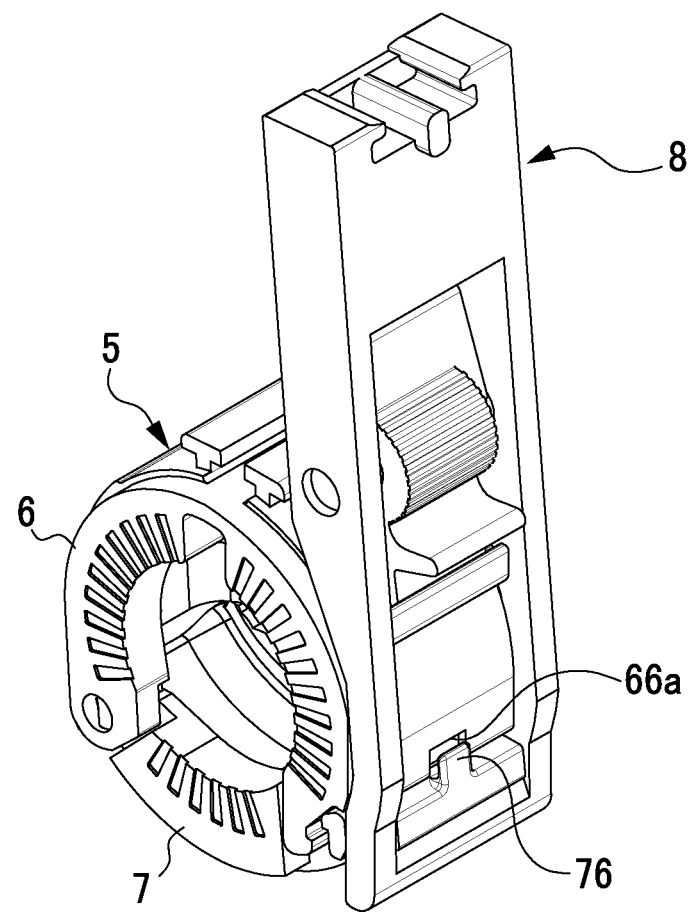
FIG. 14 is a perspective view showing the coupling member placed in a second lock position by the jig.

FIG. 13 illustrates how to bring the coupling member 5 into an engagement state using a jig 8, (a) showing the coupling member 5 before engagement, (b) showing the coupling member 5 in the process of engagement, and (c) showing the coupling member 5 placed in the first lock position by the jig 8. FIG. 14 is a perspective view showing the coupling member 5 placed in a second lock position by the jig 8. In the present embodiment, the first lock position of the coupling member 5 corresponds to a normal use position and the second lock position of the same corresponds to a further tightened (retightened) state.

Figure 15:
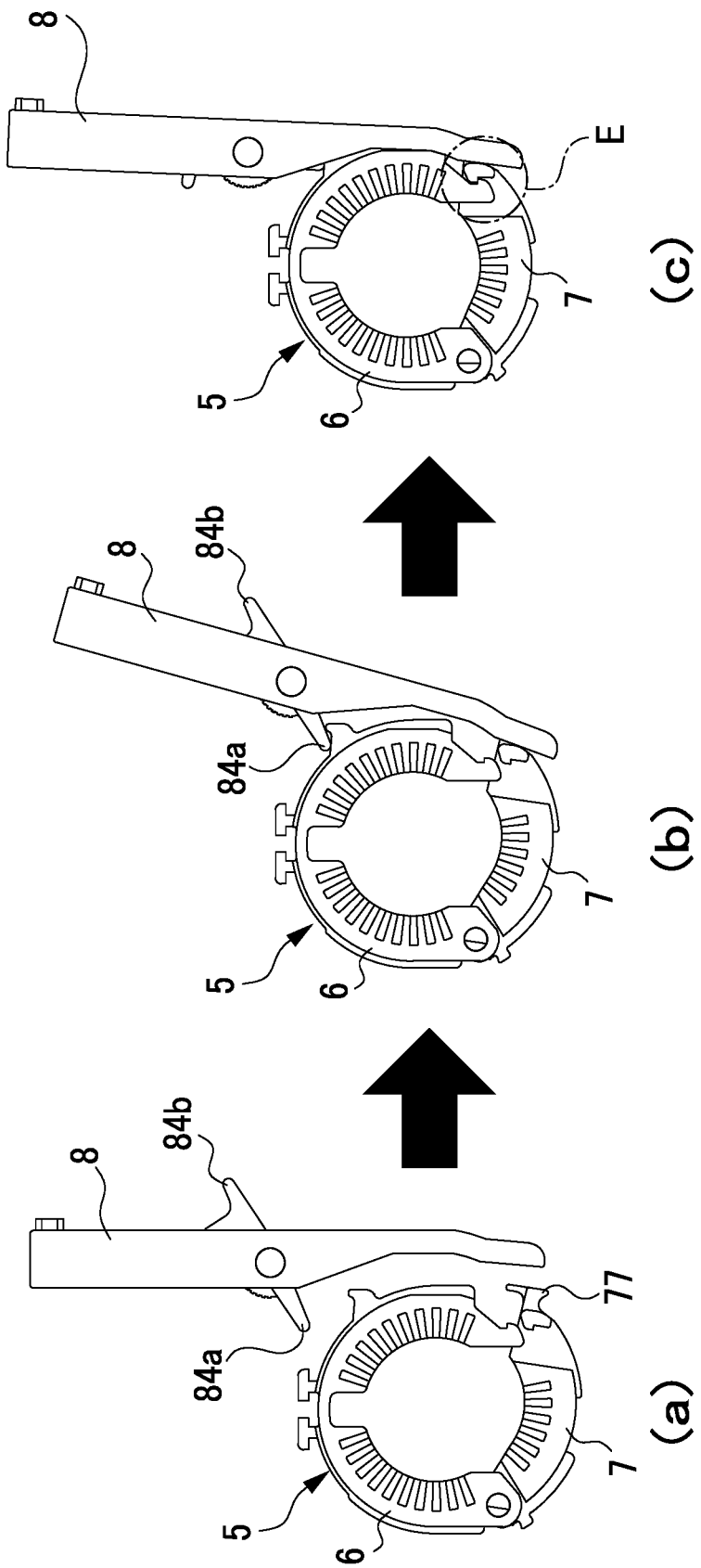
FIG. 15 is a front view corresponding to FIG. 13, (a) showing the coupling member before engagement, (b) showing the coupling member in the process of engagement, and (c) showing the coupling member placed in the first lock position by the jig.
Figure 16:
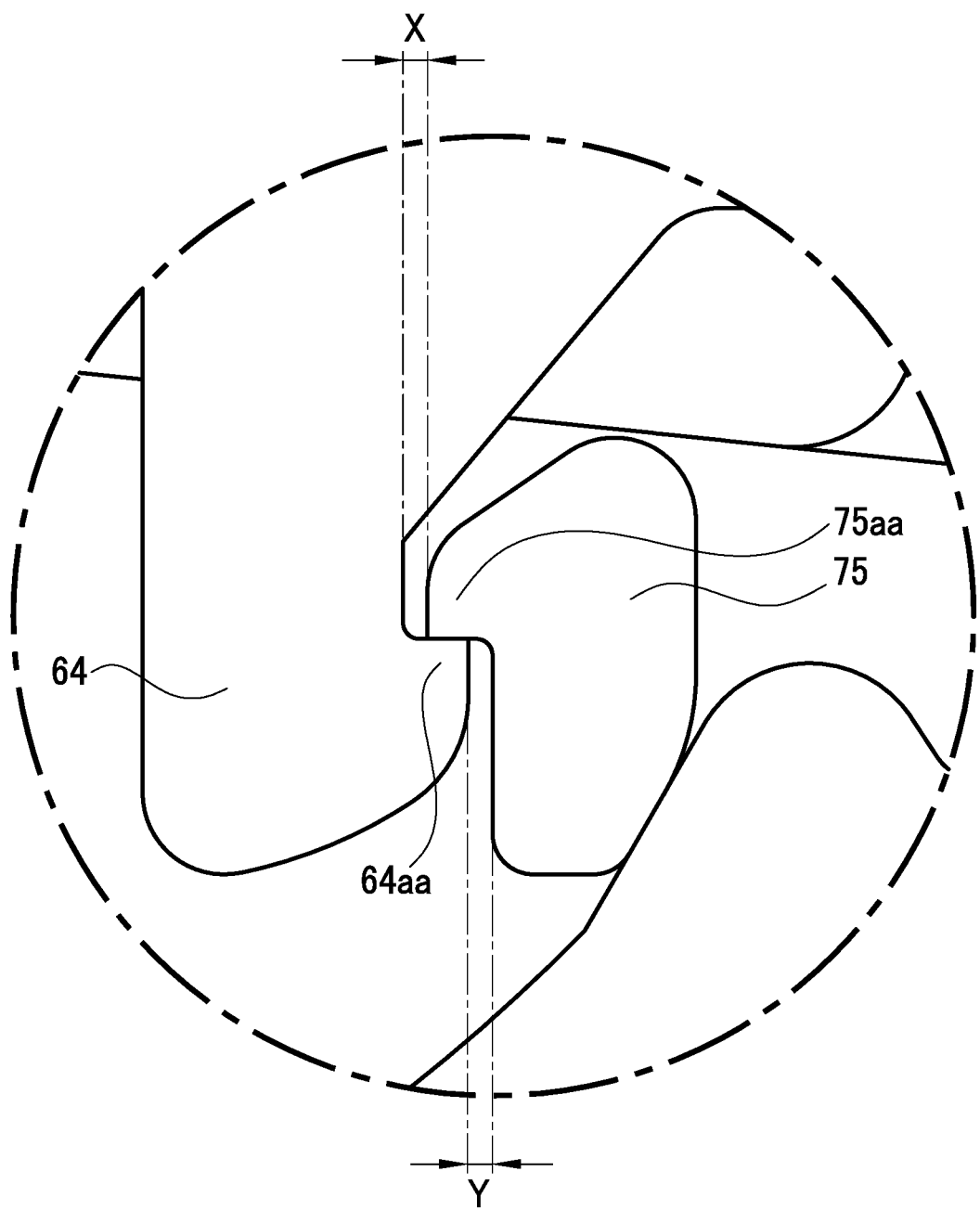
FIG. 16 is an enlarged view of a part E in FIG. 15.
Figure 17:
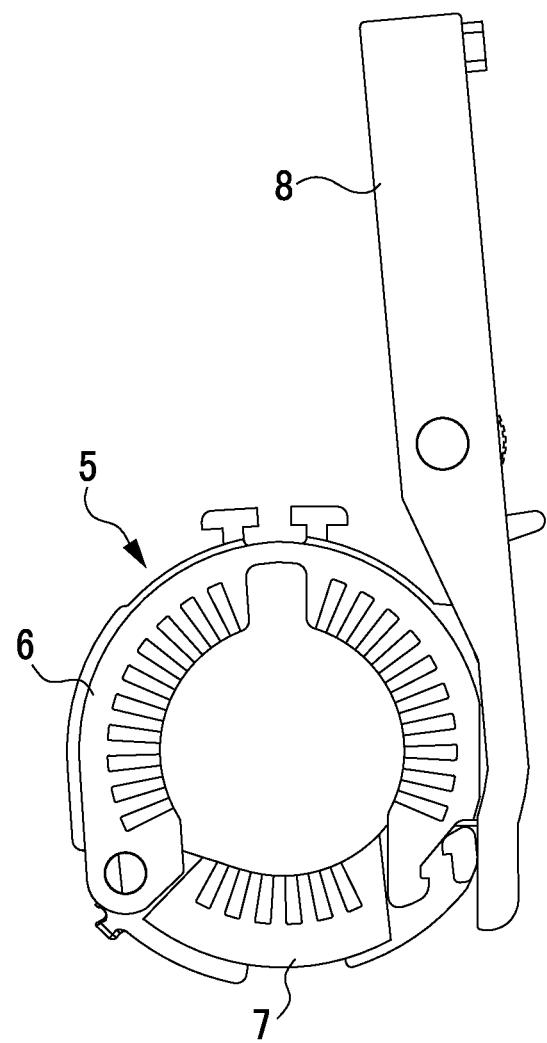
FIG. 17 is a front view of the coupling member placed in the second lock position by the jig.

FIG. 15 is a front view corresponding to FIG. 13. Specifically, FIG. 15, (a) to (c), corresponds to a front view of FIG. 13, (a) to (c). FIG. 16 is an enlarged view of a part E in FIG. 15. FIG. 17 is a front view of the coupling member 5 placed in the second lock position by the jig 8, i.e., a front view of FIG. 14.

Figure 18:
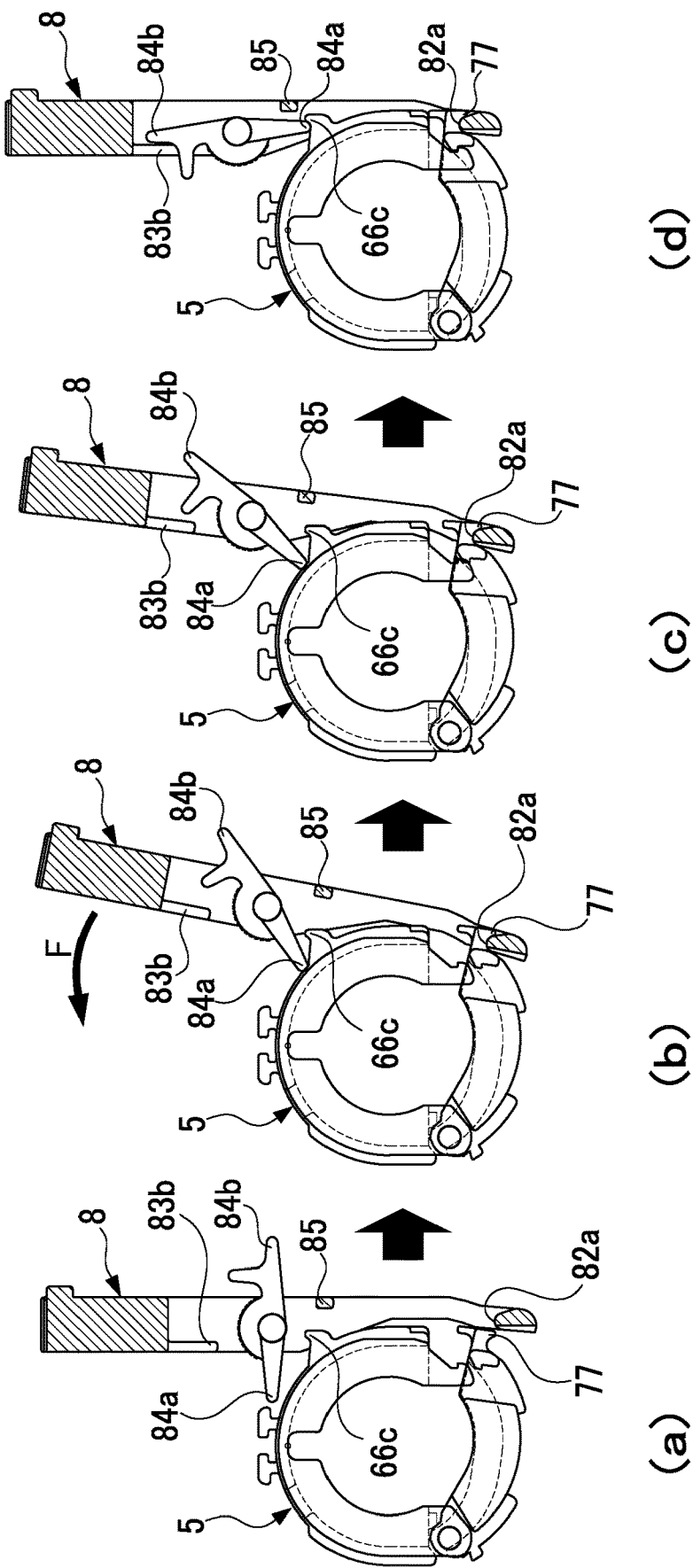
FIG. 18 is a partial cross-sectional view of the coupling member and the jig, (a) showing the coupling member before engagement by the jig, (b) showing the coupling member brought into a first halfway position in the process of engagement by the jig, (c) showing the coupling member brought into a second hallway position in the process of engagement by the jig, and (d) showing the coupling member brought into the first lock position by the jig.
Figure 19:
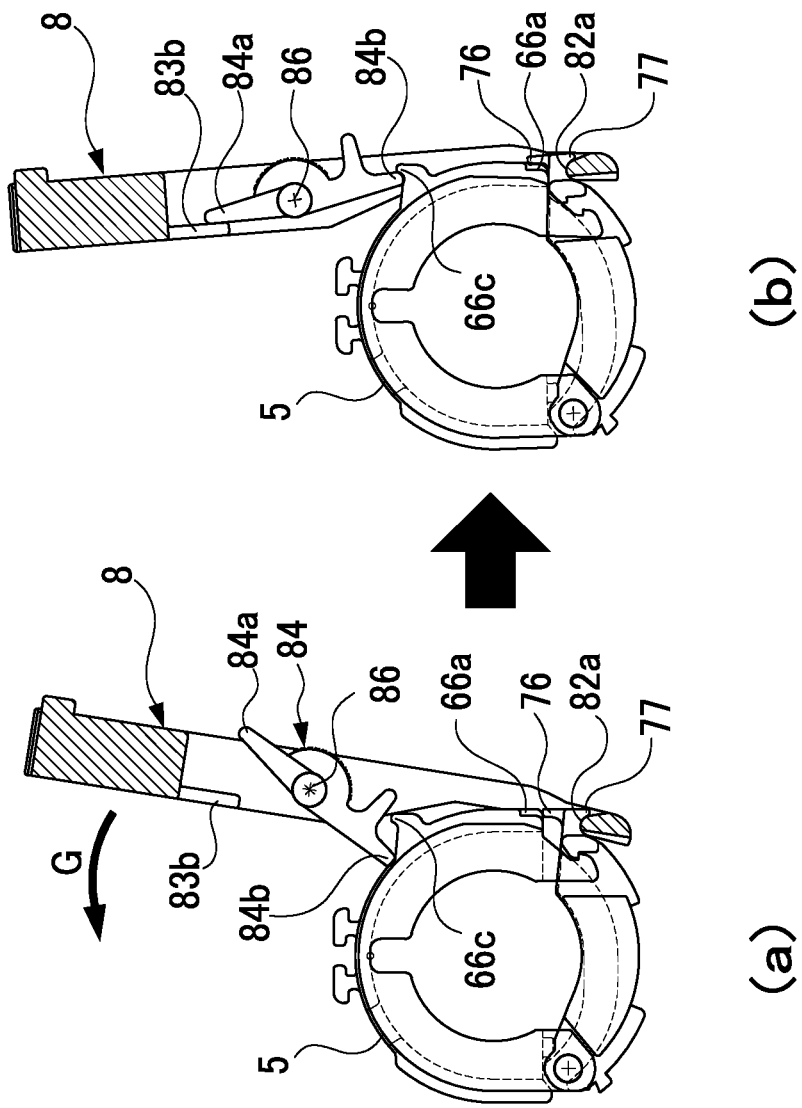
FIG. 19 is a partial cross-sectional view of the coupling member and the jig, (a) showing the coupling member brought into a halfway position toward a second lock position by the jig, and (b) showing the coupling member brought into the second lock position by the jig.

FIG. 18 is a partial cross-sectional view of the coupling member 5 and the jig 8, (a) showing the coupling member 5 before engagement by the jig, (b) showing the coupling member 5 brought into a first halfway position in the process of engagement by the jig 8, (c) showing the coupling member 5 brought into a second halfway position in the process of engagement by the jig 8, and (d) showing the coupling member 5 brought into the first lock position by the jig. FIG. 19 is a partial cross-sectional view of the coupling member 5 and the jig 8, (a) showing the coupling member 5 brought into a halfway position toward the second lock position by the jig 8, and (b) showing the coupling member 5 brought into the second lock position by the jig 8.

Figure 20:
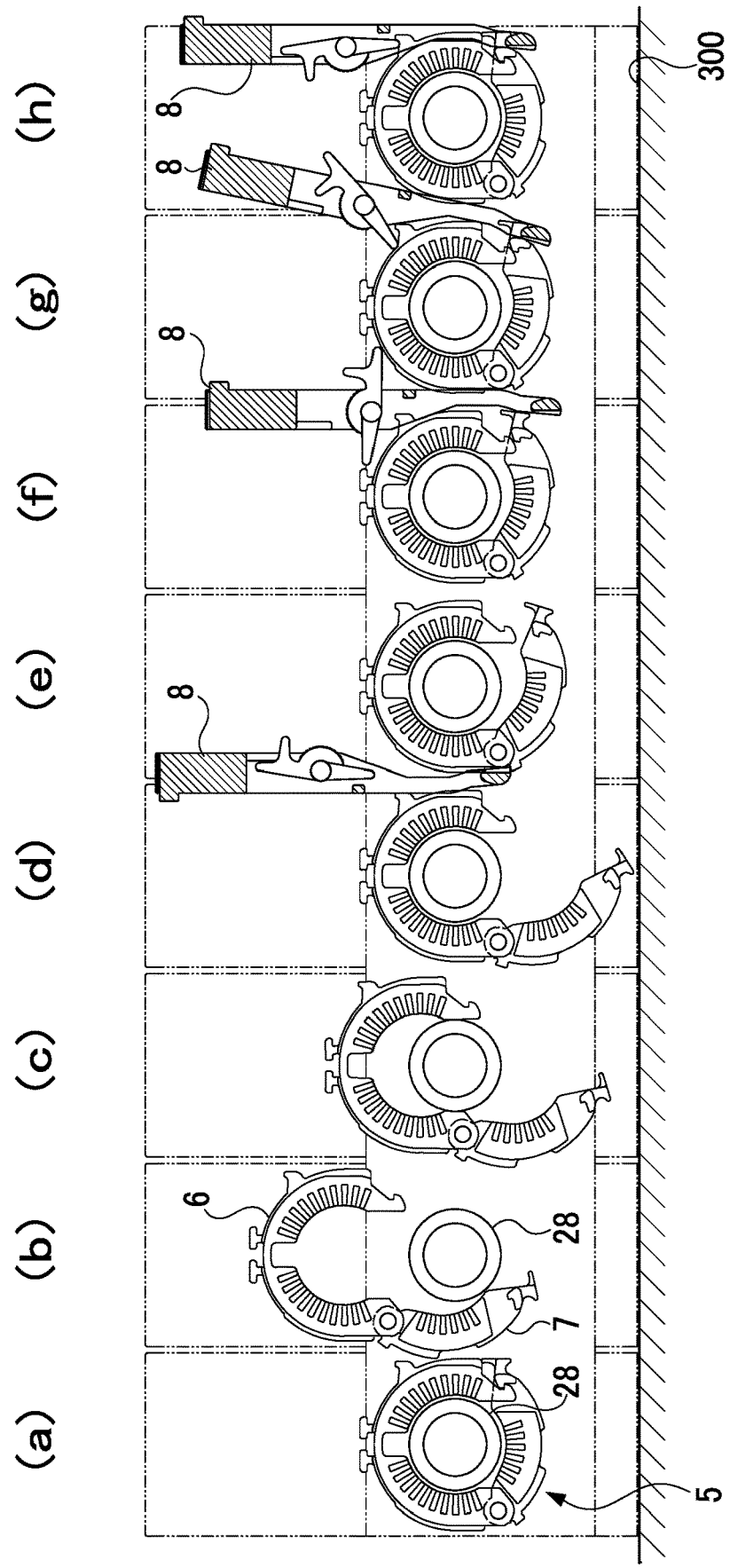
FIG. 20 is a front view of the coupling member in the process of being mounted onto fluid devices arranged in parallel.

In FIGS. 13 to 19, the first fluid device 2, the second fluid device 3, and the annular seal member 4 are not illustrated to clearly show the relationship between the coupling member 5 and jig 8. In FIGS. 18 and 19, grooves 6b and 7a of the coupling member 5 are not illustrated to clearly show the operations of the jig 8. FIG. 20 is a front view of the coupling member in the process of being mounted onto the fluid devices arranged in parallel.

Figure 26:
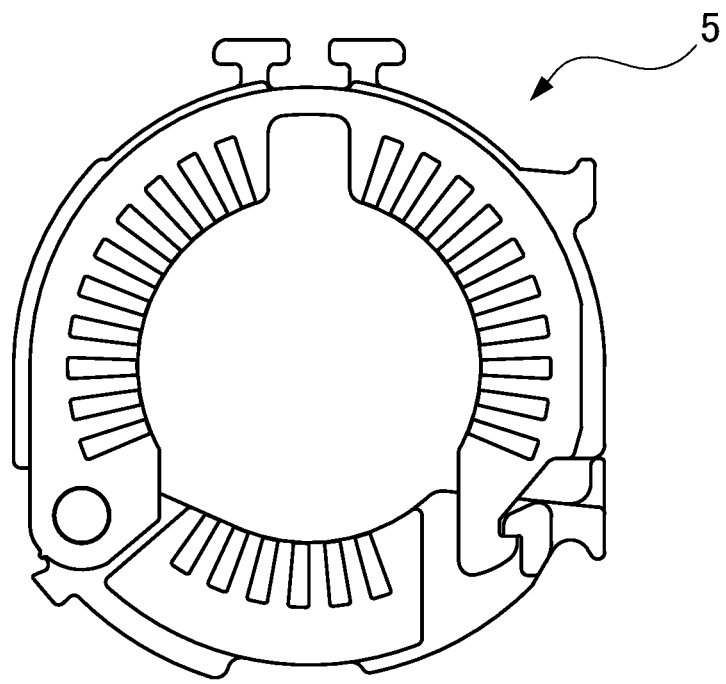
FIG. 26 is a front view of the coupling member.
Figure 27:
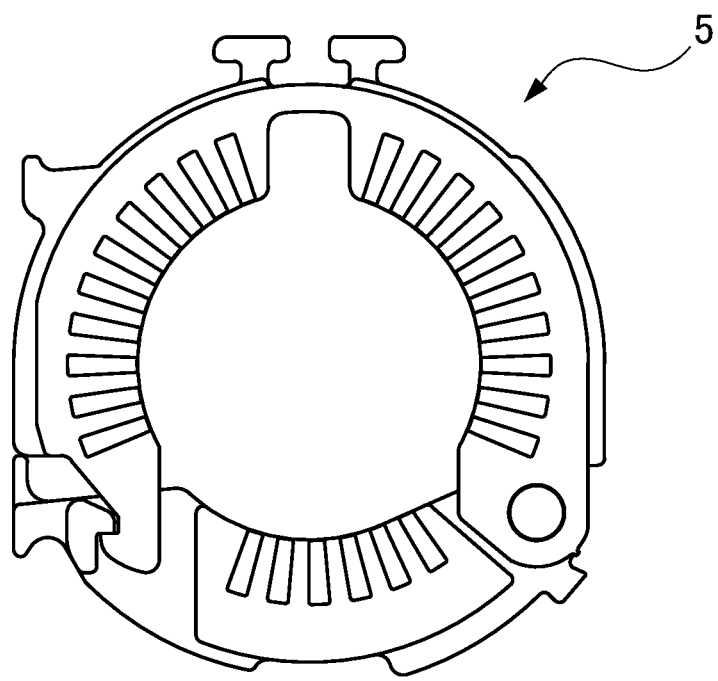
FIG. 27 is a back view of the coupling member.
Figure 28:
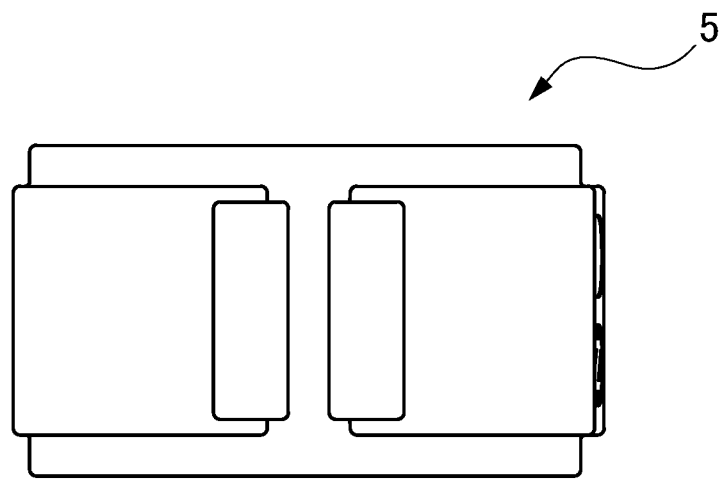
FIG. 28 is a plan view of the coupling member.
Figure 29:
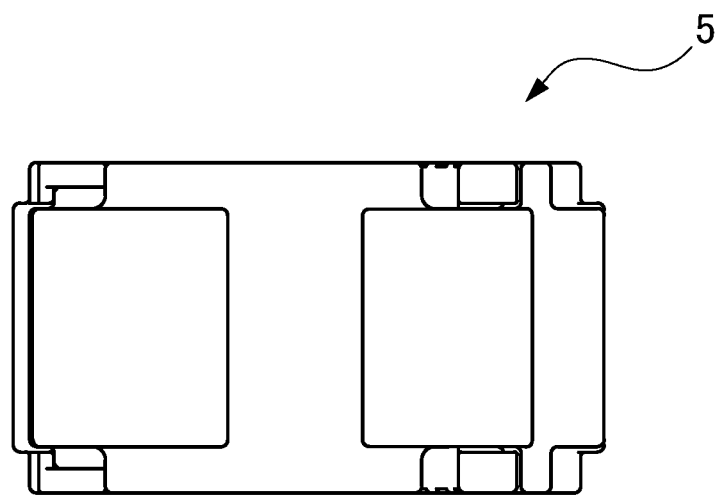
FIG. 29 is a bottom view of the coupling member.
Figure 30:
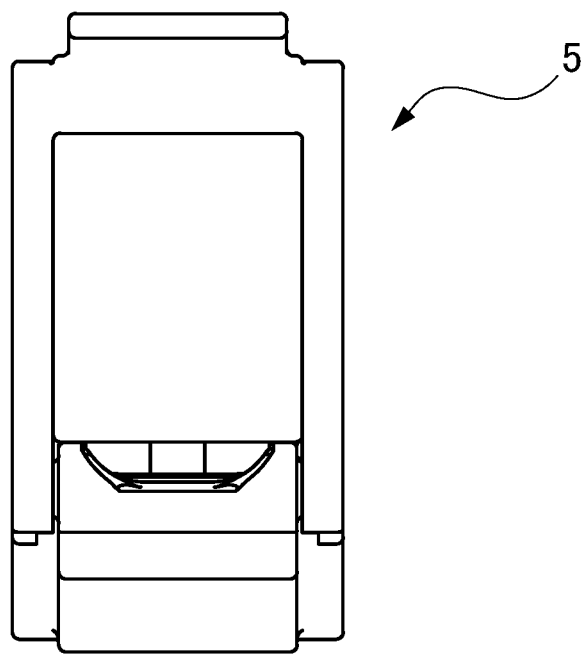
FIG. 30 is a left side view of the coupling member.
Figure 31:
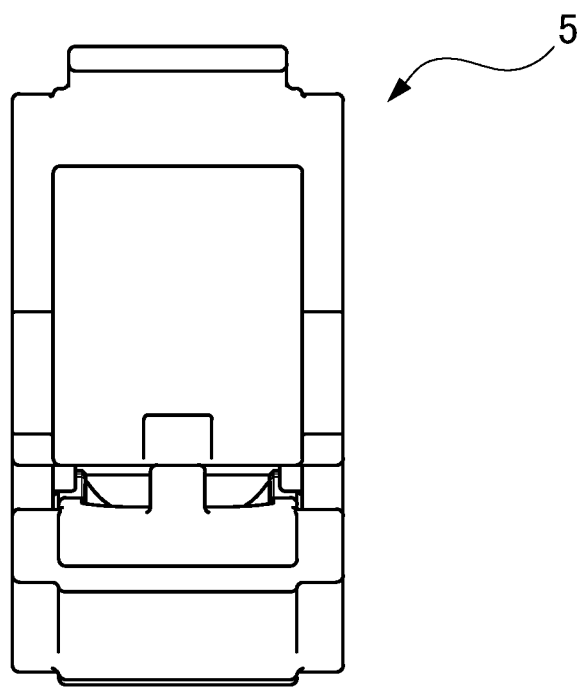
FIG. 31 is a right side view of the coupling member.
Figure 32:
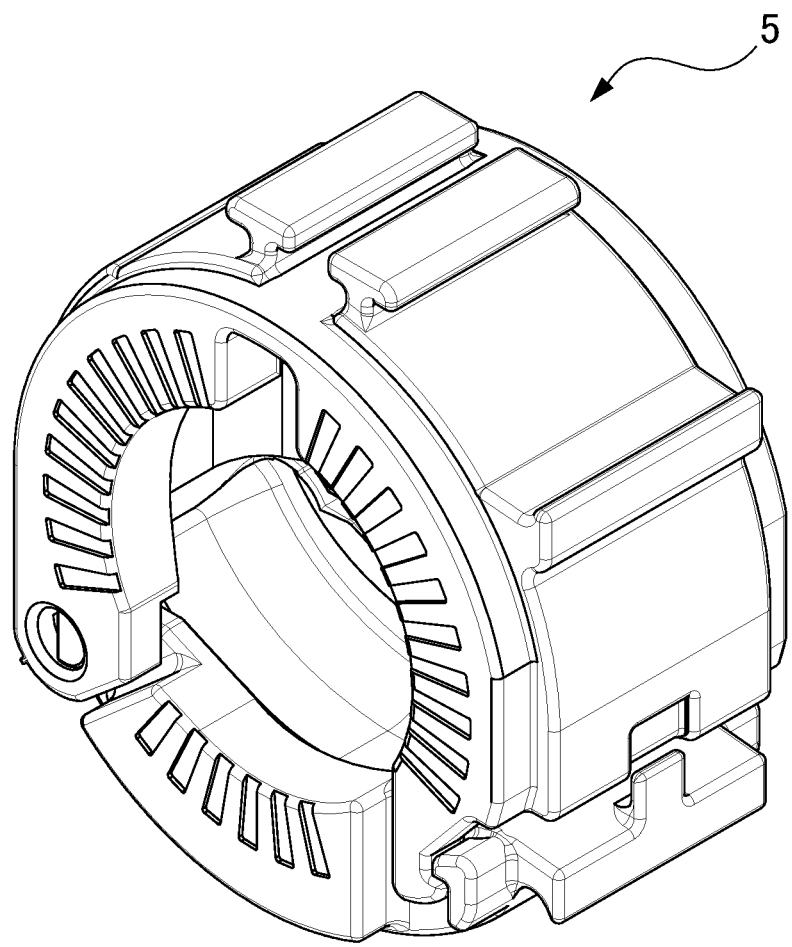
FIG. 32 is a perspective view of the coupling member.
Figure 33:
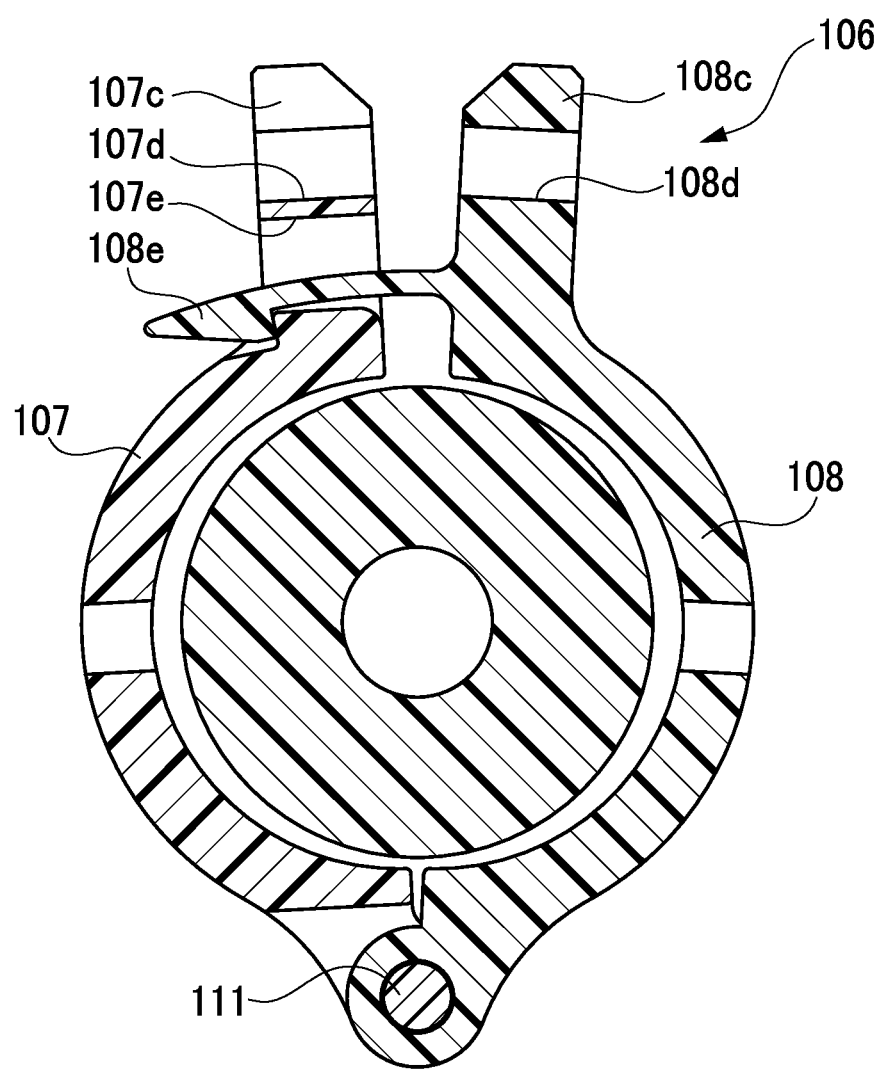
FIG. 33 is a cross-sectional view of a coupling member placed in a first lock position in a conventional fluid-device connecting structure.
Figure 34:
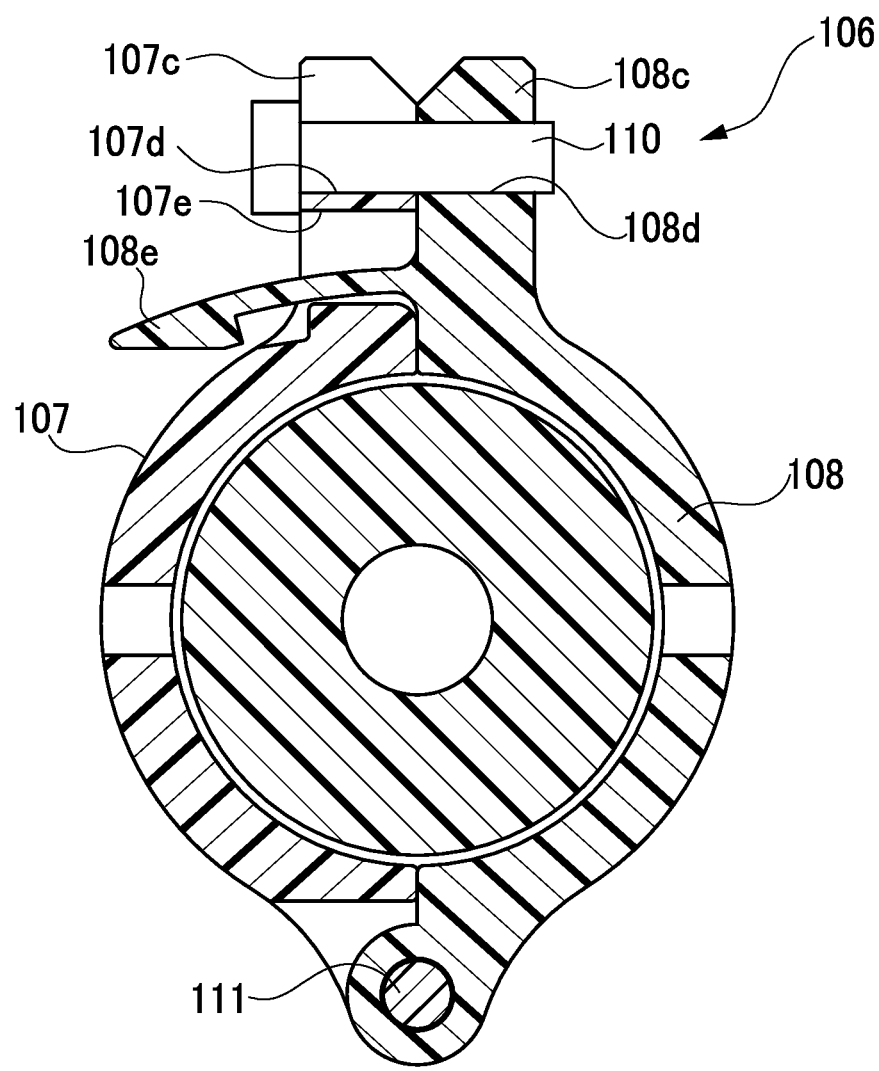
FIG. 34 is a cross-sectional view of the coupling member in a second lock position in the conventional fluid-device connecting structure.
Figure 35:
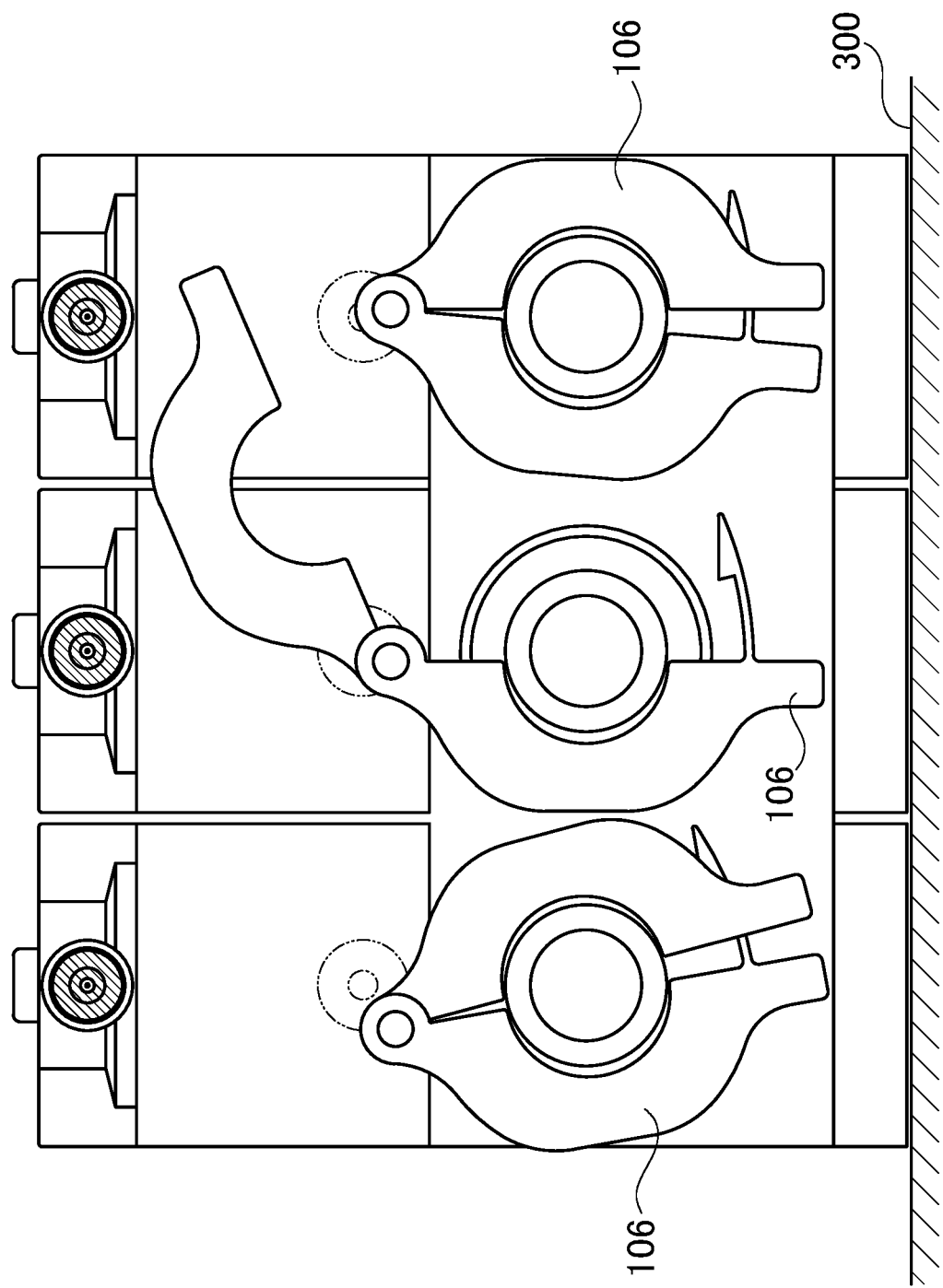
FIG. 35 is a front view of the conventional coupling member in the process of being mounted onto fluid devices arranged in parallel.

FIGS. 26 to 31 are six-sided views of the coupling member 5 shown in FIGS. 1 to 4; specifically, FIG. 26 is a front view, FIG. 27 is a back view, FIG. 28 is a plan view, FIG. 29 is a bottom view, FIG. 30 is a left side view, and FIG. 31 is a right side view. FIG. 32 is a perspective view of the coupling member 5 shown in FIGS. 1 to 4. However, the coupling member 5 in FIGS. 26 to 32 is different in appearance with entirely chamfered edges from the coupling member 5 in FIGS. 1 to 4.

(Configuration of Fluid-Device Connecting Structure)

Figure 23:
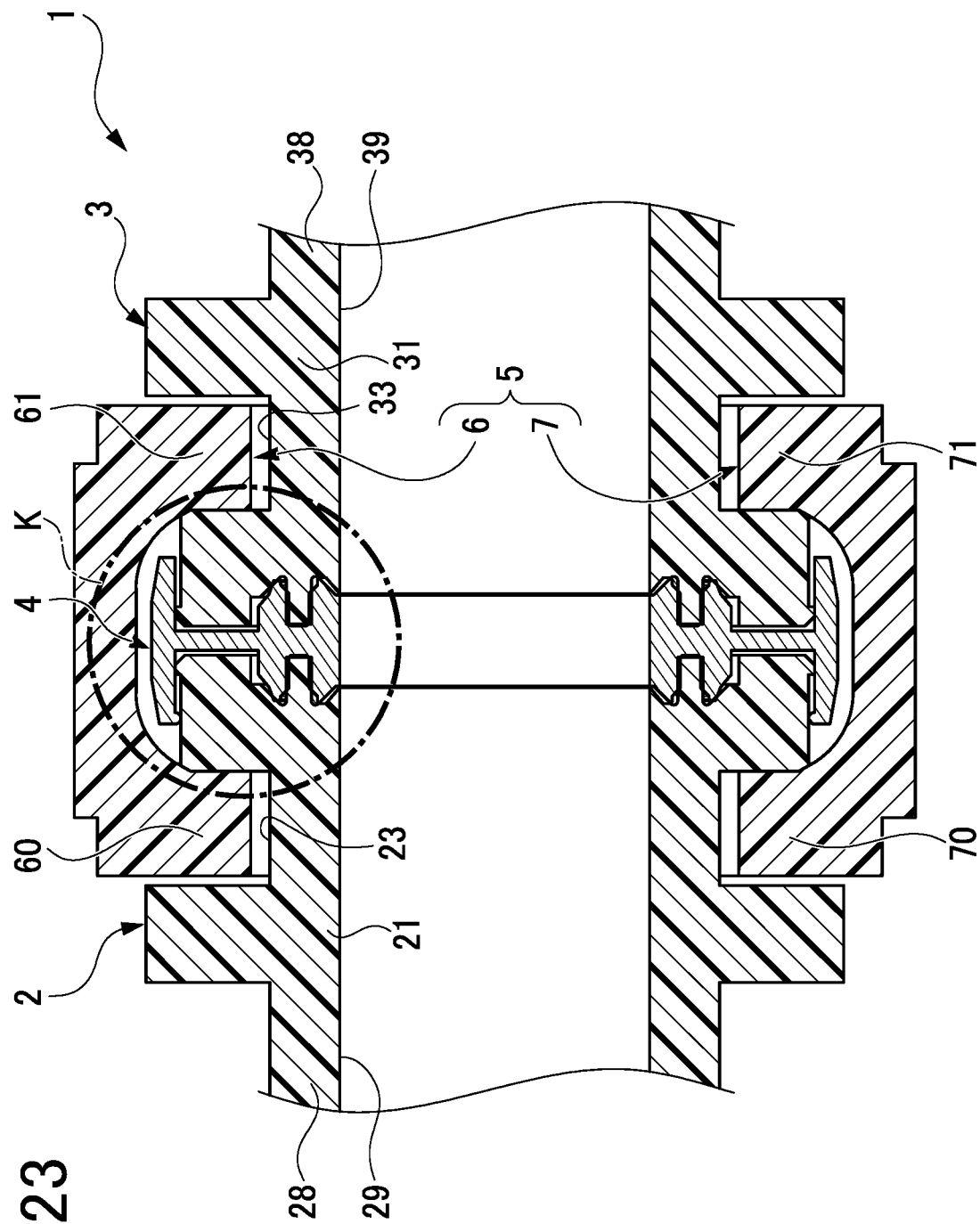
FIG. 23 is a cross-sectional view taken along a line in FIG. 12(d)
Figure 24:
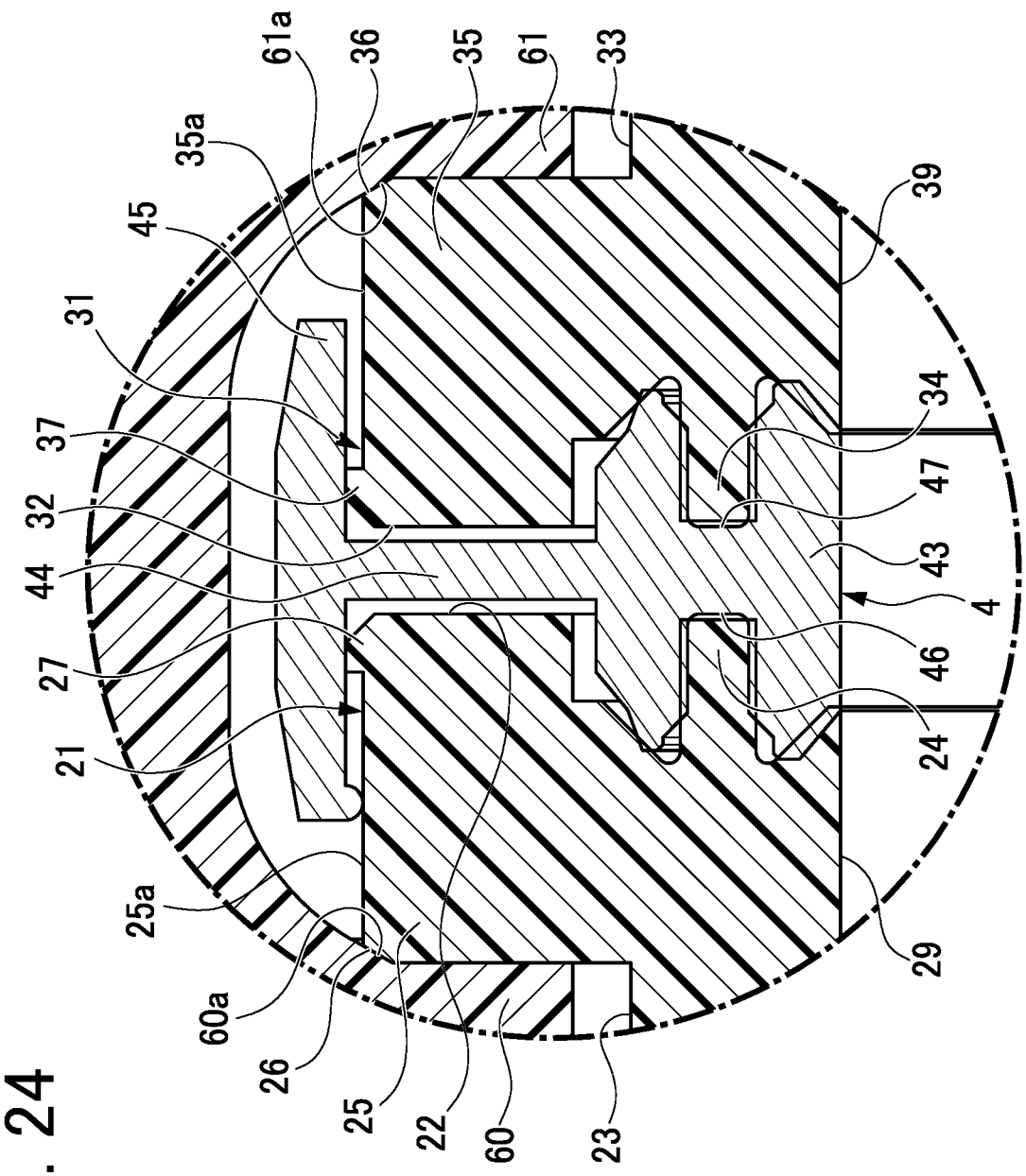
FIG. 24 is an enlarged view of a part K in FIG. 23.
Figure 25:
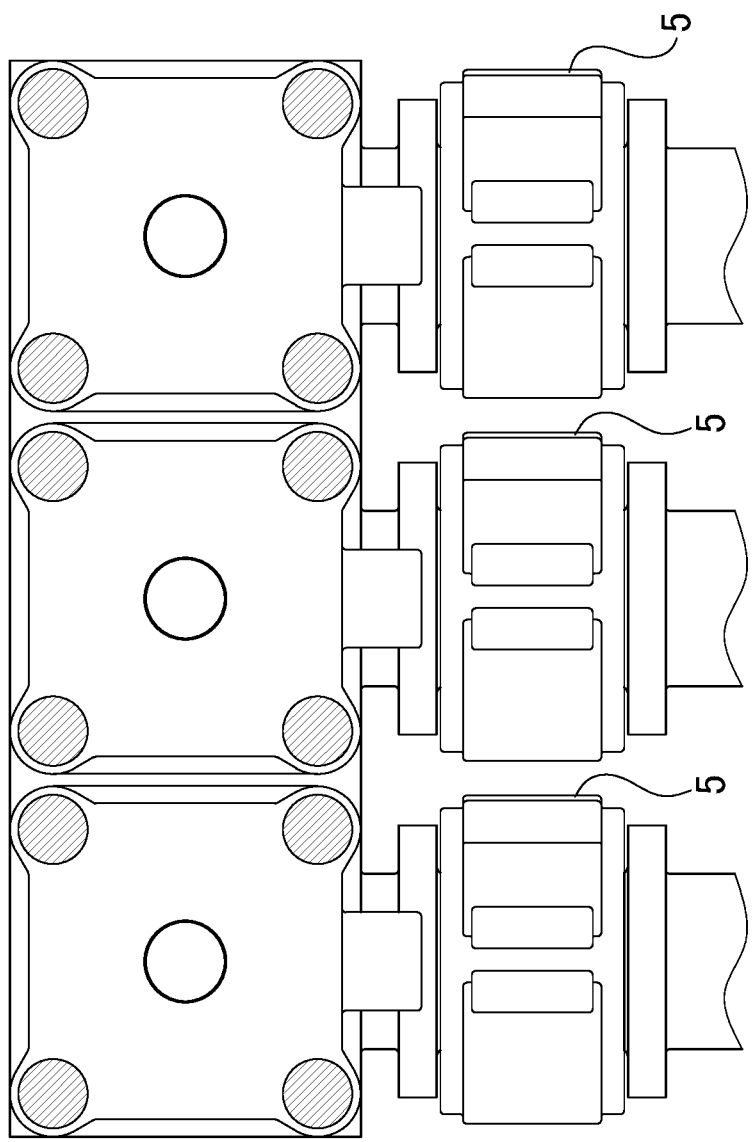
FIG. 25 is a top view of the coupling members mounted on the fluid devices arranged in parallel.

The entire configuration of the fluid-device connecting structure 1 will be described first with reference to FIG. 23. FIG. 23 is a cross-sectional view taken along a line D-D in FIG. 12(d). FIG. 24 is an enlarged view of a part K in FIG. 23.

In the fluid-device connecting structure 1, as shown in FIG. 23, a first connection part 21 of the first fluid device 2 is connected to a second connection part 31 of the second fluid device 3 through the annular seal member 4. The first connection part 21 and the second connection part 31 are kept in a connected state by the coupling member 5 mounted on the outer peripheries of the connection parts 21 and 31. The coupling member 5 consists of a first coupling segment 6 and a second coupling segment 7. The first connection part 2 and the second connection part 31 each have a round, or cylindrical, outer shape. A tubular part 28 of the first connection part 21 has a flow passage 29 and a tubular part 38 of the second connection part 31 has a flow passage 39. The tubular parts 28 and 38 are located respectively adjacent to flange parts 25 and 35 which will be mentioned later.

The annular seal member 4 is provided, as shown in FIG. 24, with a main body 43, a web portion 44 extending radially outward from the outer peripheral surface of the main body 43, and a retaining portion 45 formed along an outer peripheral edge of the web portion 44. The main body 43 is formed with annular seal grooves 46 and 47. The annular seal member 4 is made of fluorocarbon resin that is relatively rigid and resistant to corrosion, such as PFA and PTFE. It is noted that the cross section of the annular seal member 4 made of resin in FIGS. 23 and 24 is hatched with a different hatching pattern from a hatching pattern of the coupling member 5 made of resin for facilitating distinction.

The first connection part 21 has an end face 22 to which the annular seal member 4 is attached. This end face 22 is formed with an engagement protrusion 27 extending outward in a radial direction of the first connection part 21. The end face 22 is formed, inside in the radial direction, with a press-fit portion 24 which is fitted in the annular seal groove 46 of the main body 43 of the annular seal member 4. Furthermore, the outer peripheral surface of the first connection part 21 on an opposite side to the end face 22 in an axis direction of the flow passage 29 is formed with an annular mounting groove 23 in a flange adjoining portion, on which the coupling member 5 is mounted. The flange part 25 is provided between the end face 22 and the mounting groove 23 and formed with a connection-side taper surface 26.

The second connection part 31 has an end face 32 to which the annular seal member 4 is attached. This end face 32 is formed with an engagement protrusion 37 extending outward in a radial direction of the second connection part 31. The end face 32 is formed, inside in the radial direction, with a press-fit portion 34 which is fitted in the annular seal groove 47 of the main body 43 of the annular seal member 4. The outer peripheral surface of the second connection part 31 on an opposite side to the end face 32 in an axis direction of the flow passage 39 is formed with an annular mounting groove 33 in a flange adjoining portion, on which the coupling member 5 is mounted. The flange part 35 is provided between the end face 32 and the mounting groove 33 and formed with a connection-side taper surface 36.

(Configuration of Coupling Member)

Internal connection configuration of the coupling member 5 for coupling the first fluid device 2 and the second fluid device 3 will be described below.

Figure 1:
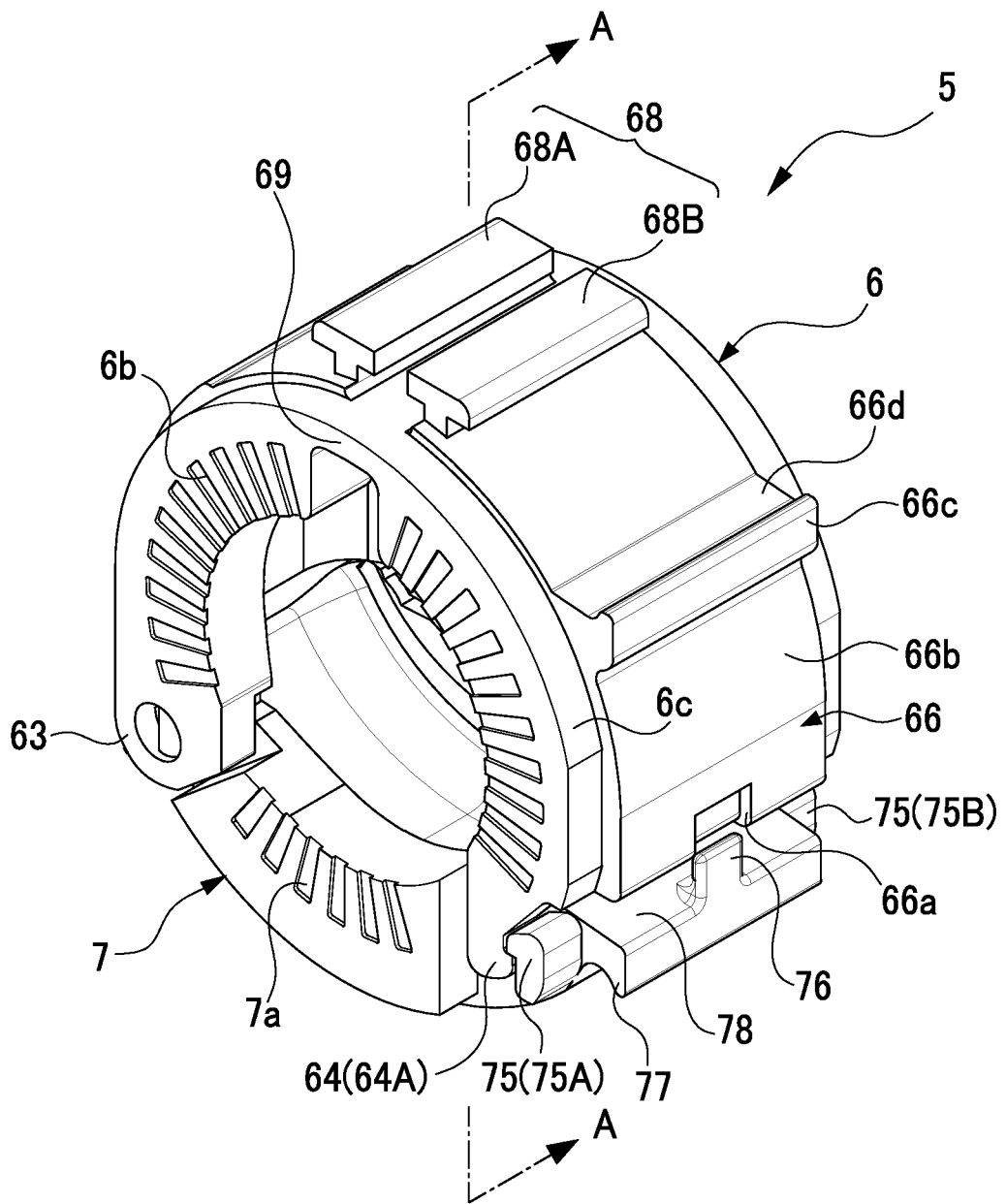
FIG. 1 is a perspective view of a coupling member in a first lock position.

The coupling member 5 has a cylindrical shape as shown in FIG. 1, including the first coupling segment 6 and the second coupling segment 7. These first coupling segment 6 and second coupling segment 7 are each made of fluorocarbon resin that is rigid and resistant to corrosion. It is noted that, for facilitating viewing, the cross section of each of the first coupling segment 6 and the second coupling segment 7 in FIG. 6 and others is hatched with a different hatching pattern from a normal resin or plastic hatching pattern (FIG. 23). Each of the first coupling segment 6 and the second coupling segment 7 has an arcuate inner circumferential surface so that each coupling segment 6, 7 is attachable along the outer periphery of the first connection part 21 and the second connection part 31. The coupling member 5 can hold the first connection part 21 and the second connection part 31 in a connected state against the force of the annular seal member 4 attached between the first connection part 21 and the second connection part 31, the force acting to separate the first connection part 21 and the second connection part 31 from each other in the axis direction of the flow passages 29 and 39.

As shown in FIG. 23, the coupling member 5 is placed such that a first protruding portion 60 of the first coupling segment 6 and a first protruding portion 70 of the second coupling segment 7 are set in the mounting groove 23 and also a second protruding portion 61 of the first coupling segment 6 and a second protruding portion 71 of the second coupling segment 7 are set in the mounting groove 33. The first coupling segment 6 of the coupling member 5 is formed with coupling-side taper surfaces 60a and 61a at positions respectively corresponding to the connection-side taper surface 26 of the first connection part 21 and the connection-side taper surface 36 of the second connection part 31. The connecting structure of the first coupling segment 6 and the second coupling segment 7 of the coupling member 5 to the first connection part 21 and the second connection part 31 is vertically symmetric as shown in FIG. 23. Thus, only the connecting structure of the first coupling segment 6 will be described below and explanation of the connecting structure of the second coupling segment 7 is omitted.

An external configuration of the coupling member 5 is described in detail below with reference to FIGS. 1 to 9. It is noted that parts or components in pair are assigned reference signs suffixed with alphabets A and B, but these suffixed alphabets are omitted as appropriate for clarity of explanation.

Figure 2:
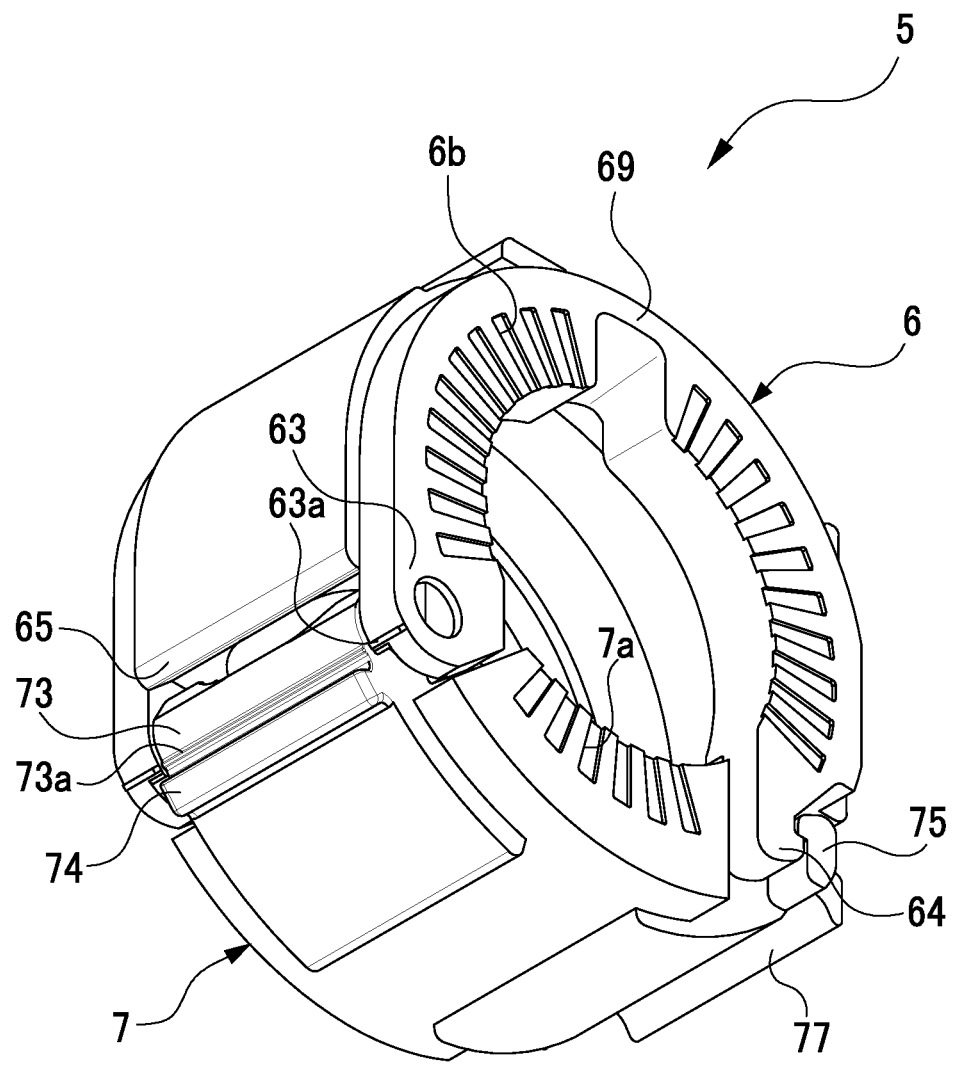
FIG. 2 is another perspective view of the coupling member in the first lock position.
Figure 3:
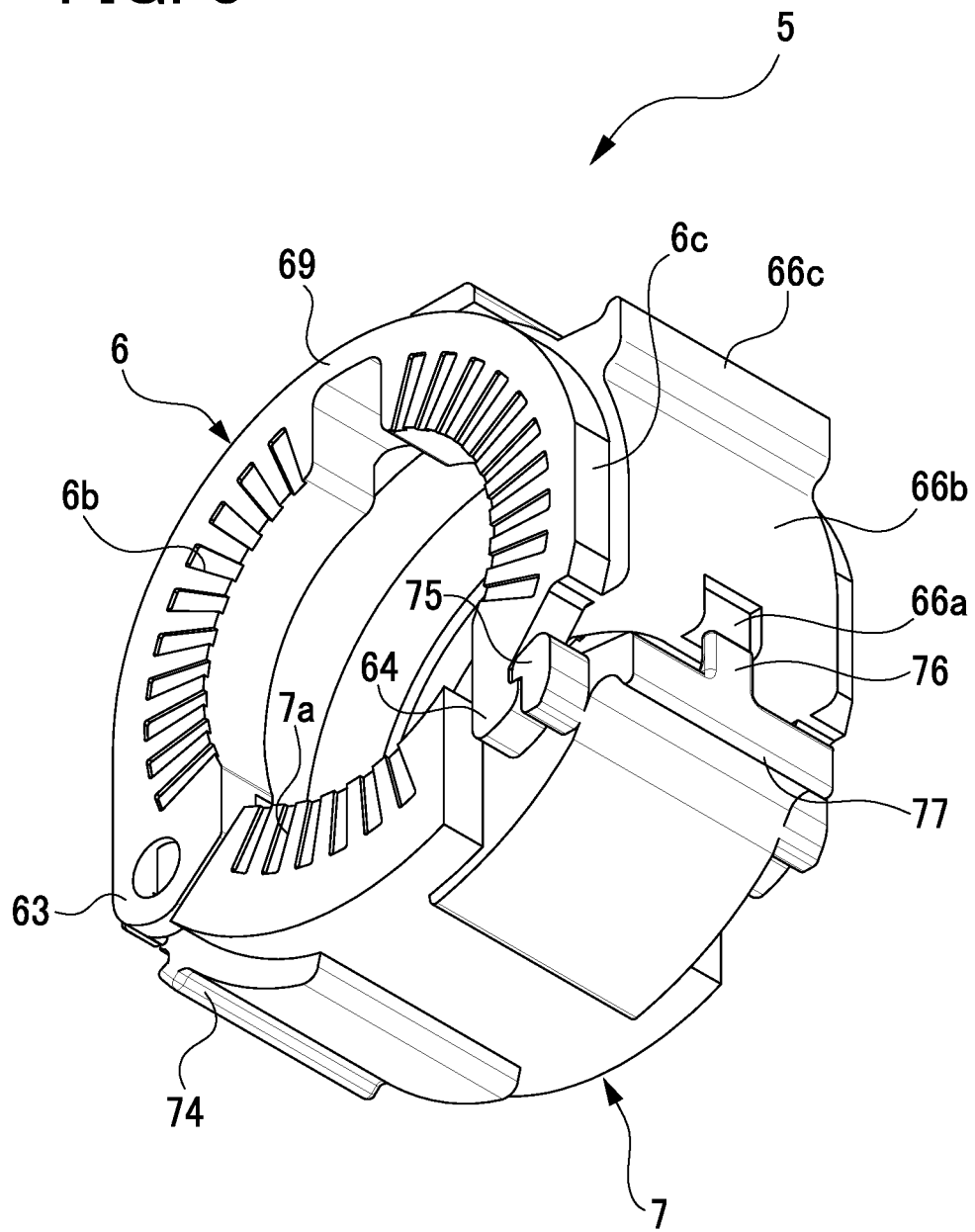
FIG. 3 is another perspective view of the coupling member in the first lock position.
Figure 4:
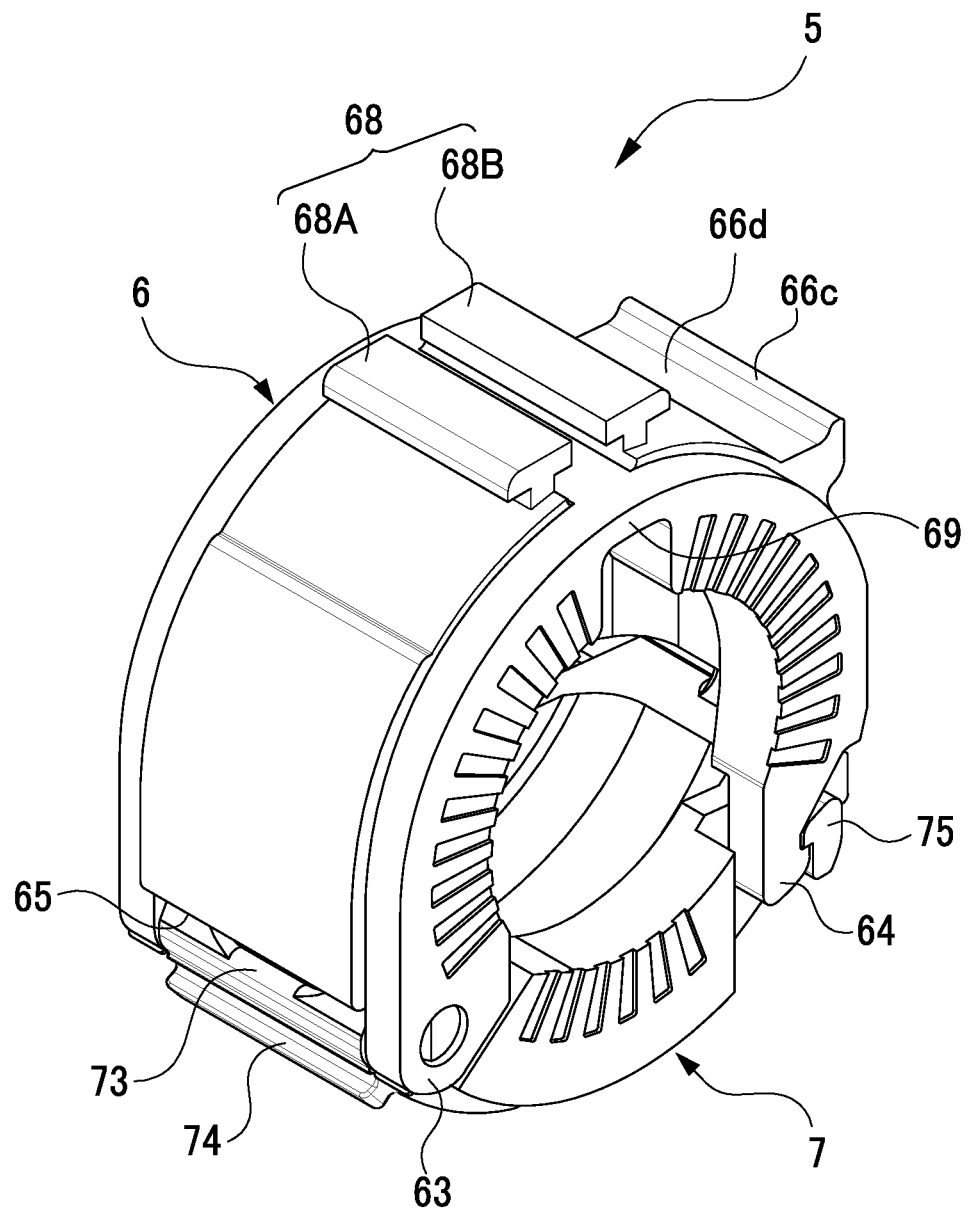
FIG. 4 is another perspective view of the coupling member in the first lock position.

The first coupling segment 6 of the coupling member 5 has a nearly U-like shape having an opening 6a in a cross section taken in a direction perpendicular to the axis direction of the coupling member 5 as shown in FIG. 7. The first coupling segment 6 has an arc length so as to engage with the second coupling segment 7 at points spaced more than 180 degrees of the entire circumference of the coupling member 5, that is, the entire circumference of a circular cross section of each of the first connection part 21 and the second connection part 31. The second coupling segment 7 forms a shape covering the opening 6a of the first coupling segment 6. The end faces of each of the first coupling segment 6 and the second coupling segment 7 in the axis direction of the coupling member 5 are formed with a plurality of grooves 6b or 7a axially recessed, and radially extended. As shown in FIG. 2, one end (a first end) of the first coupling segment 6 in its circumferential direction is formed with an end portion 65, both ends of which in the axis direction of the coupling member 5 are formed with first hinge parts 63. One end (a first end) of the second coupling segment 7 in its circumferential direction is formed with a second hinge part 73 which is rotatably engaged with the first hinge parts 63. Each of the first hinge parts 63 is formed on its outer surface with a guide projection 63a extending in the axis direction. The second hinge part 73 is formed on its outer surface with a guide projection 73a extending in the axis direction. Accordingly, an operator can check with eyes or by touch that the guide projections 63a and 73a are aligned in line as shown in FIG. 2 and recognize the first coupling segment 6 and the second coupling segment 7 are properly engaged with each other. The first hinge parts 63 and the second hinge part 73 in the present embodiment are one example of a rotational joint part of the present disclosure.

As shown in FIG. 5, at the other end (a second end) of the first coupling segment 6 in the circumferential direction, a pair of first locking parts 64 (64A, 64B) is formed at both ends in the axis direction of the coupling member 5 and extending straight toward the second coupling segment 7. The first locking parts 64A and 64B have the same shape and thus they are hereinafter collectively referred to as a first locking part 64. The first locking part 64 is formed at its end with a distal end portion 64aa bent outward in a radial direction of the coupling member 5.

The first coupling segment 6 includes, as part of the inner circumferential surface, a thin-wall portion 69 having a cutout 69a at the center along the outer circumferential edge of the first coupling segment 6. The first coupling segment 6 is provided, on its outer peripheral surface, a pair of attachment locking parts 68 (68A and 68B) each having a T-like shape at a position corresponding to the thin-wall portion 69. A raised part 66 is provided on the outer peripheral surface of the first coupling segment 6 on a side close to the first locking part 64. At the other end (the second end) of the first coupling segment 6 in the circumferential direction, the raised part 66 is formed with a recess 66a at the center in the axis direction. When the recess 66a can receive an after-mentioned claw 76 of the second coupling segment 7 to overlap therewith, the retightened state of the coupling member 5 is visually recognized. The raised part 66 has a curved portion 66b gently curving toward the attachment locking part 68. A second jig-catching part 66c is located between the curved portion 66b and the attachment locking part 68. The second jig-catching part 66c has a hooked shape protruding toward the attachment locking part 68. This second jig-catching part 66c includes a jig-engaging surface 66d on an opposite side to the curved portion 66b. The first coupling segment 6 includes depressed portions 6c which are located one at each end in the axis direction and extend over the entire circumference of the first coupling segment 6. Each depressed portion 6c is sunken lower than the raised part 66. Even when a plurality of fluid devices are placed in parallel as shown in FIG. 20, the depressed portions 6c enables the jig 8 to closely move along the target coupling member 5 to enter between the fluid devices arranged in parallel without causing interference with an adjacent coupling member 5.

As shown in FIG. 5, at the other end (a second end) of the second coupling segment 7 in the circumferential direction, a pair of first locked parts 75 (75A, 75B) is formed at both ends in the axis direction of the coupling member 5 and extending straight toward the first coupling segment 6. The first locked parts 75 (75A, 75B) are engageable with the first locking parts 64 (64A, 64B) of the first coupling segment 6. The first locked parts 75A and 75B have the same shape and thus they are also hereinafter collectively referred to as a first locked part 75. The first locked part 75 is formed at its end with a distal end portion 75aa bent inward in the radial direction of the coupling member 5. Furthermore, the second coupling segment 7 has an inner circumferential surface which will contact with the first connection part 21 and the second connection part 31 and this inner circumferential surface includes chamfered portions 7c that will not contact with the first connection part 21 and the second connection part 31. The chamfered portions 7c have a taper surface to avoid interference with the flange part 25 of the first connection part 21 and the flange part 35 of the second connection part 31 shown in FIG. 24. This can smoothly move the second coupling segment 7 toward the first coupling segment 6 until the second coupling segment 7 can be caught by the jig 8 as mentioned later.

The distal end portions 64aa of the first locking parts 64 and the distal end portions 75aa of the first locked parts 75 are engaged with each other as shown in FIG. 16. This engagement position is referred to as a first lock position. In this state, an elastic force constantly acts on the first locked parts 75 to press toward the first locking parts 64. At that time, the distal end portions 64aa and the distal end portions 75aa engage with each other through their flat planes, or in flat contact. Thus, if a force attempting to disengage the coupling member 5 acts on the coupling member 5, the distal end portions 64aa and the distal end portions 75aa bite each other, holding their engagement relationship without allowing disengagement of the coupling member 5. In the first lock position, there are formed a clearance X between the distal end portion 75aa of the first locked part 75 and the first locking part 64 and a clearance Y between the distal end portion 64aa of the first locking part 64 and the first locked part 75. These clearances X and Y allow the distal end portion 64aa and the distal end portion 75aa to reliably engage with each other.

In the second coupling segment 7, a single extended portion 78 is provided between the first locked parts 75A and 75B and protrudes outward in the radial direction as shown in FIG. 1. At the center of the protruding edge of this extended portion 78, the claw 76 protrudes upright toward the first coupling segment 6. In the extended portion 78, a first jig-catching part 77 protrudes on an opposite side to the claw 76 and extends along the axis direction of the coupling member 5.

The second coupling segment 7 is provided, on its outer periphery at a position near the second hinge part 73, with a rotation inducing part 74 protruding radially outward as shown in FIG. 2. When the second coupling segment 7 is rotated by a fixed angle, opening the first coupling segment 6 as shown in FIG. 7, the rotation inducing part 74 abuts on the end portion 65 of the first coupling segment 6 to hold the second coupling segment 7 against rotation beyond the fixed angle. At that time, as shown by a fourth coupling member 5 (FIG. 20(e)) from right in FIG. 20, the rotation inducing part 74 is pushed from one way by the jig 8 to induce rotation of the second coupling segment 7 in a direction of bringing the first locked parts 75 close to the first locking parts 64.

The first coupling segment 6 further includes first resistive projections 6d near the first hinge part 63, on the inner circumferential side of the end portion 65. The second coupling segment 7 further includes resistive projections 7b near the second hinge part 73. The second resistive projections 7b can contact with the first resistive projections 6d. When the first resistive projections 6d and the second resistive projections 7b come into contact with each other, a frictional force is generated by friction therebetween, thus preventing rotation of the second coupling segment 7 by own weight. Accordingly, the first coupling segment 6 and the second coupling segment 7 are temporarily fixed. The first resistive projections 6d and the second resistive projections 7b in the present embodiment are one example of a "resistance generating part" in the present disclosure.

(Configuration of Jig)

Figure 10:
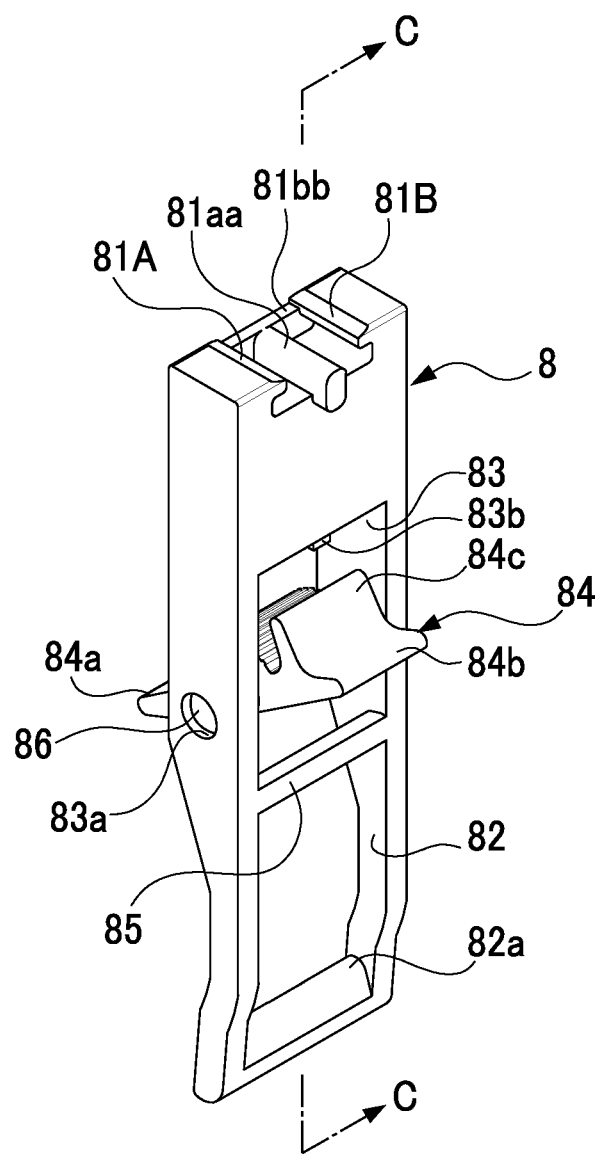
FIG. 10 is a perspective view of a fluid-device connecting jig.
Figure 11:
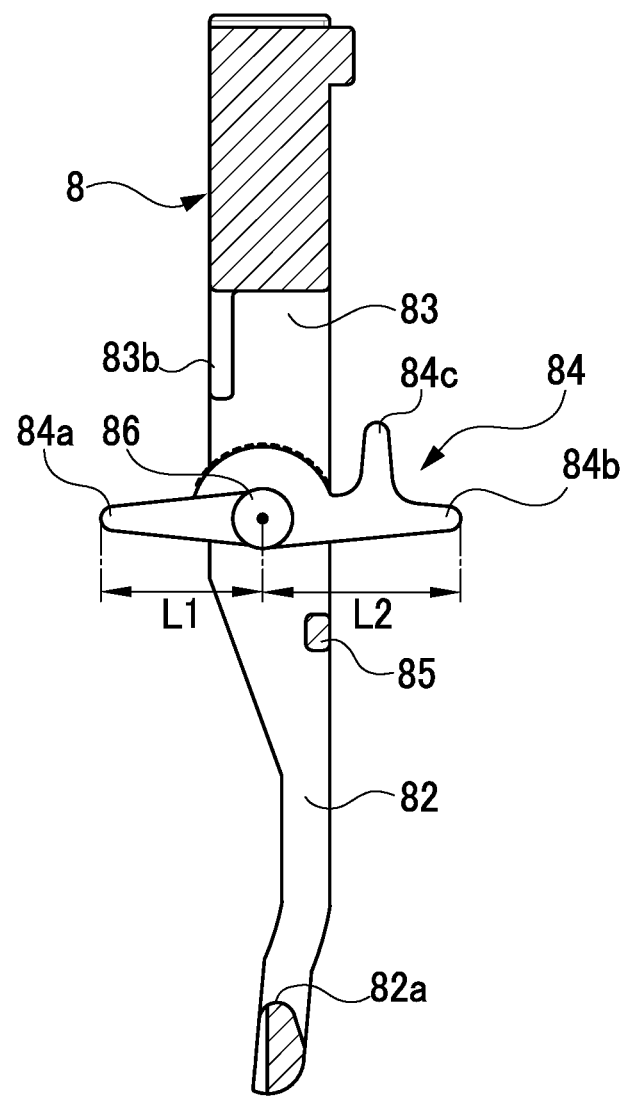
FIG. 11 is a cross-sectional view taken along a line C-C in FIG. 10.

Next, the configuration of the fluid-device connecting jig 8 (hereinafter, simply referred to as a "jig") will be described with reference to FIGS. 10 and 11. FIG. 10 is a perspective view of the jig 8. FIG. 11 is a cross-sectional view taken along a line C-C in FIG. 10.

The jig 8 has a rectangular thin-plate-like shape. This jig 8 is provided, at one end in its longitudinal direction (an upper end in FIG. 10), with a pair of locked parts 81A and 81B respectively engageable with the attachment locking parts 68A and 68B of the coupling member 5. The locked parts 81A and 81B each protrude from either end of the jig 8 in its width direction toward the center thereof. A rib 81aa is provided between the locked parts 81A and 81B. The jig 8 further includes, at the one end in the longitudinal direction, a stopper 81bb between the locked parts 81A and 81B to pass across the rib 81aa.

In the jig 8, at the other end in the longitudinal direction (a lower end in FIG. 10), there is formed a first through-hole part 82 having a rectangular shape and including a common hooking part 82a in a position corresponding to the other end of the jig 8. In the jig 8, furthermore, at the center and adjacent to the first through-hole part 82, there is formed a second through-hole part 83 having a rectangular shape and including pivot holes 83a in which a pivot shaft 86 integral with the rotary member 84 is rotatably supported. One end of the rotary member 84 is formed with a hooking part 84a for first lock position (hereinafter, a "first-lock-position hooking part") having a rounded end shape. The other end of the rotary member 84 is formed with a hooking part 84b for a second lock position (hereinafter, a "second-lock-position hooking part") having a smaller width than the first-lock-position hooking part 84a. As shown in FIG. 11, moreover, the length L1 from the outer edge of the first-lock-position hooking part 84a to the central axis of the pivot shaft 86 is designed to be shorter than the length L2 from the outer edge of the second-lock-position hooking part 84b to the central axis of the pivot shaft 86. In the second through-hole part 83, on a side closer to the locked parts 81A and 81B, a pair of projected parts 83b is formed at both ends of the jig 8 in its width direction (see FIG. 22). These projected parts 83b allow the narrow, second-lock-position hooking part 84b to pass through the inside of the second through-hole part 83 (i.e., between the pair of projected parts 83b), but block the wide, first-lock-position hooking part 84a by contact therewith from passing through the second through-hole part 83 to control the rotation of the rotary member 84. The rotary member 84 is provided with a branch portion 84c on a side close to the second-lock-position hooking part 84b. Further, the jig 8 further includes a bridge 85 detachably attached between the first through-hole part 82 and the second through-hole part 83.

(Operations of Fluid-Device Connecting Structure)

The normal use state of the coupling member 5 brought from an initial state to the first lock position will be described below with reference to FIGS. 12, 13, 15, 16, and 18. The normal use state represents a state where the coupling member 5 is placed in the first lock position as shown in FIG. 12(d). In this first lock position, the first locking parts 64 of the first coupling segment 6 engage with the first locked parts 75 of the second coupling segment 7.

Firstly, the annular seal member 4 is put between the first fluid device 2 and the second fluid device 3 as shown in FIGS. 12(a) and (b), the annular seal member 4 is then press-fit into the first fluid device 2 and the second fluid device 3, and the coupling member 5 is mounted on the first fluid device 2, second fluid device 3, and the annular seal member 4 so that the grooves 6b of the coupling member 5 disappear as shown in FIG. 12(c). At that time, as shown in FIG. 8, the opening 6a of the first coupling segment 6 has a dimension N smaller than the diameter (i.e. the outer diameter) P of each of the tubular part 28 of the first connection part 21 and the tubular part 38 of the second connection part 31. The thin-wall portion 69 of the first coupling segment 6 is elastically deformable. Therefore, in an operation of mounting the first coupling segment 6 onto the tubular part 28 of the first connection part 21, the first coupling segment 6 is deformed outward to expand the dimension N of the opening 6a by just a distance corresponding to a difference M between the dimension N of the opening 6a and the diameter P of each tubular part 28 and 38. In this way, the first coupling segment 6 can be installed to straddle the first connection part 21 and the second connection part 31 over a range more than 180 degrees of the entire circumference of each connection part 21 and 31. Then, the second coupling segment 7 is engaged with the first coupling segment 6 in the first lock position as shown in FIG. 12(d). This establishes a connection between the connection parts 21 and 31 by the coupling member 5 in the normal use state ("connection in a normal use state"). In this state, the grooves 6b and 7a of the coupling member 5 disappear from view. This disappearance of the grooves 6b and 7a hidden by the first connection part 21 and the second connection part 31 allows an operator to recognize that the coupling member 5 is mounted in a proper position.

With reference to FIG. 20, the following explanation is given to a mounting operation of the coupling member 5 in such a narrow space as shown in FIG. 9 where an operator cannot reach for the bottom side of each fluid device. FIG. 20(a) shows a connection completed state during normal use. The connection steps are sequentially illustrated from (b) to (h) in FIG. 20. As shown in FIG. 20(b), after the first connection part 21 and the second connection part 31 are temporarily connected, the second coupling segment 7 is inserted between adjacent tubular parts 28 from an opposite side to the installation surface 300. As shown in FIG. 20(c), the second coupling segment 7 is rotated somewhat in advance toward the tubular part 28, and the first coupling segment 6 is mounted onto the first connection part 21 and the second connection part 31. As shown in FIG. 20(d), when the first coupling segment 6 is fitted on the tubular part 28, the second coupling segment 7 contacts with the installation surface 300 and accordingly further rotates toward the tubular part 28. As shown in FIG. 20(e), the narrow, long jig 8 is inserted, on the side of the first hinge part 63 of the first coupling segment 6, from an opposite side to the installation surface 300, until a leading end of the jig 8 pushes ahead the rotation inducing part 74 of the second coupling segment 7. Accordingly, the second coupling segment 7 is rotated about the second hinge part 73, bringing the first locked parts 75 close to the first coupling segment 6 until the second resistive projections 7b abut on the first resistive projections 6d, so that the second coupling segment 7 is temporarily fixed at that position by a frictional force generated by friction between the first resistive projections 6d and the second resistive projections 7b. As shown in FIGS. 20(f), (g), and (h), thereafter, the jig 8 is inserted, on the side of the first locking parts 64, from the opposite side to the installation surface 300 and lifted up while pulling up the second coupling segment 7 until the second coupling member 7 is locked by the first coupling segment 6.

The steps in FIGS. 20 (f), (g), and (h) 20 will be described in detail below with reference to FIG. 18. As shown in of FIGS. 18 (a) and (b), the jig 8 is set on the side surface of the coupling member 5 from the same direction as a direction of mounting the coupling member 5. At that time, the jig 8 goes forward (downward in FIG. 18) along the depressed portions 6c of the coupling member 5. Thus, even when the fluid devices are arranged side by side, the jig 8 is allowed to move without interference with an adjacent coupling member 5. Then, the common hooking part 82a of the jig 8 engages, at a position near the first coupling segment 6, with the first jig-catching part 77 of the second coupling segment 7 temporarily fixed, as shown in FIG. 20(f).

Successively, the jig 8 is tilted in a direction indicated by an arrow F. At the same time, the second-lock-position hooking part 84b is pushed in the arrow F direction as shown in FIGS. 18 (c) and (d), causing the first-lock-position hooking part 84a to move along the jig-engaging surface 66d of the first coupling segment 6 and abut on the second jig-catching part 66c. Accordingly, the first locked parts 75 come close to and engage with the first locking parts 64, so that the coupling member 5 is placed in the first lock position. Thereafter, the second-lock-position hooking part 84b of the jig 8 is pushed in a direction opposite to the arrow F direction, and the jig 8 is disengaged from the first jig-catching part 77 and then removed. The coupling member 5 is thus completely placed in a normal use state to connect the first connection part 21 and the second connection part 31. In this state, a clearance S is formed between the raised part 66 of the first coupling segment 6 and the extended portion 78 as shown in FIG. 6. At that time, the leading end of the claw 76 is located in line with the open end of the recess 66a as shown in FIG. 6. By visually observing their locations, an operator can recognize that the connection in the normal use state is established.

In the above manner, the jig 8 can be inserted from the same direction as a direction of mounting the coupling member 5 onto the first connection part 21 and the second connection part 31 to engage the first coupling segment 6 and the second coupling segment 7 with each other. This enables the work of mounting the coupling member 5 with the jig 8 in only one direction. Such an one-way work can be easily performed with good workability in even a narrow space where many fluid devices are installed in parallel.

Next, the retightened state of the coupling member 5 in the second lock position changed from the first lock position will be described below with reference to FIGS. 14, 17, and 19.

In some cases where the first connection part 21 and the second connection part 31 are exposed repeatedly alternately to for example abnormally high temperature liquid (chemical liquid) and abnormally low temperature liquid (pure water) for long term periods, causing creep deformation, or where a foreign matter(s) is lodged between the annular seal member 4, first connection part 21, and second connection part 31 in a connected state, the sealing strength may deteriorate. Such a deterioration of the sealing strength may cause leakage of liquid. In this emergency situation, retightening, i.e. further tightening, of the coupling member 5 is performed.

Specifically, the retightening is carried out using the second-lock-position hooking part 84b of jig 8, having the longer distance (L2) from the pivot shaft 86 than the distance (L1) of the first-lock-position hooking part 84a used in placing the coupling member 5 in the first lock position. To enable rotation of the rotary member 84 to use the second-lock-position hooking part 84b, the bridge 85 of the jig 8 is removed. Then, the rotary member 84 can be rotated. The need for such an additional step of removing the bridge 85 prior to a retightening operation can prevent an operator from erroneously retightening the coupling member 5.

As shown in FIG. 19 (a), the common hooking part 82a of the jig 8 hooks or engages with the first jig-catching part 77 of the second coupling segment 7. Then, the jig 8 is tilted in a direction indicated with an arrow G. At the same time, the first-lock-position hooking part 84a is pushed in the arrow G direction, causing the second-lock-position hooking part 84b to move along the jig-engaging surface 66d and abut on the second jig-catching part 66c. Furthermore, the first-lock-position hooking part 84a is positioned in place by coming into contact with the projected parts 83b. Since the first-lock-position hooking part 84a is longer than the second-lock-position hooking part 84b as described above, a strong force acts in a direction of drawing the first coupling segment 6 and the second coupling segment 7 close to each other by the principle of leverage. At that time, the first coupling segment 6 and the second coupling segment 7 come near to each other by reducing the clearance S between the raised part 66 of the first coupling segment 6 and the extended portion 78 of the second coupling segment 7.

As shown in FIGS. 23 and 24, the first coupling segment 6 of the coupling member 5 is provided with coupling-side taper surfaces 60a and 61a at positions facing the connection-side taper surface 26 of the first connection part 21 and the taper surface 36 of the second connection part 31. Therefore, when the first coupling segment 6 and the second coupling segment 7 come close, the coupling-side taper surfaces 60a and 61a respectively press against the connection-side taper surfaces 26 and 36, thereby pushing the first connection part 21 and the second connection part 31 against the annular seal member 4. This state can prevent liquid leakage. The connecting structure of the second coupling segment 7 with the first connection part 21 and the second connection part 31, which is seen on a lower side in FIG. 23, is symmetrically identical to an upper side, i.e., the connecting structure of the first coupling segment 6 with the first connection part 21 and the second connection part 31.

After the jig 8 is engaged with the coupling member 5 in the aforementioned steps, the coupling member 5 is completely positioned in the retightened state, namely, the second lock position.

Furthermore, while the jig 8 remains attached to the coupling member 5, the presence of this jig 8 indicates an operator that the tightening work has been completed. Since the jig 8 remaining attached to the coupling member 5 represents the retightened state, the operator can easily check the retightened state from appearance. During maintenance, therefore, the operator can find a fluid device with the coupling member in the retightened state at a glance and accordingly address the emergency case by for example stopping the flow of fluid or replacing a defective coupling member 5. Thus, good workability can be achieved.

Figure 21:
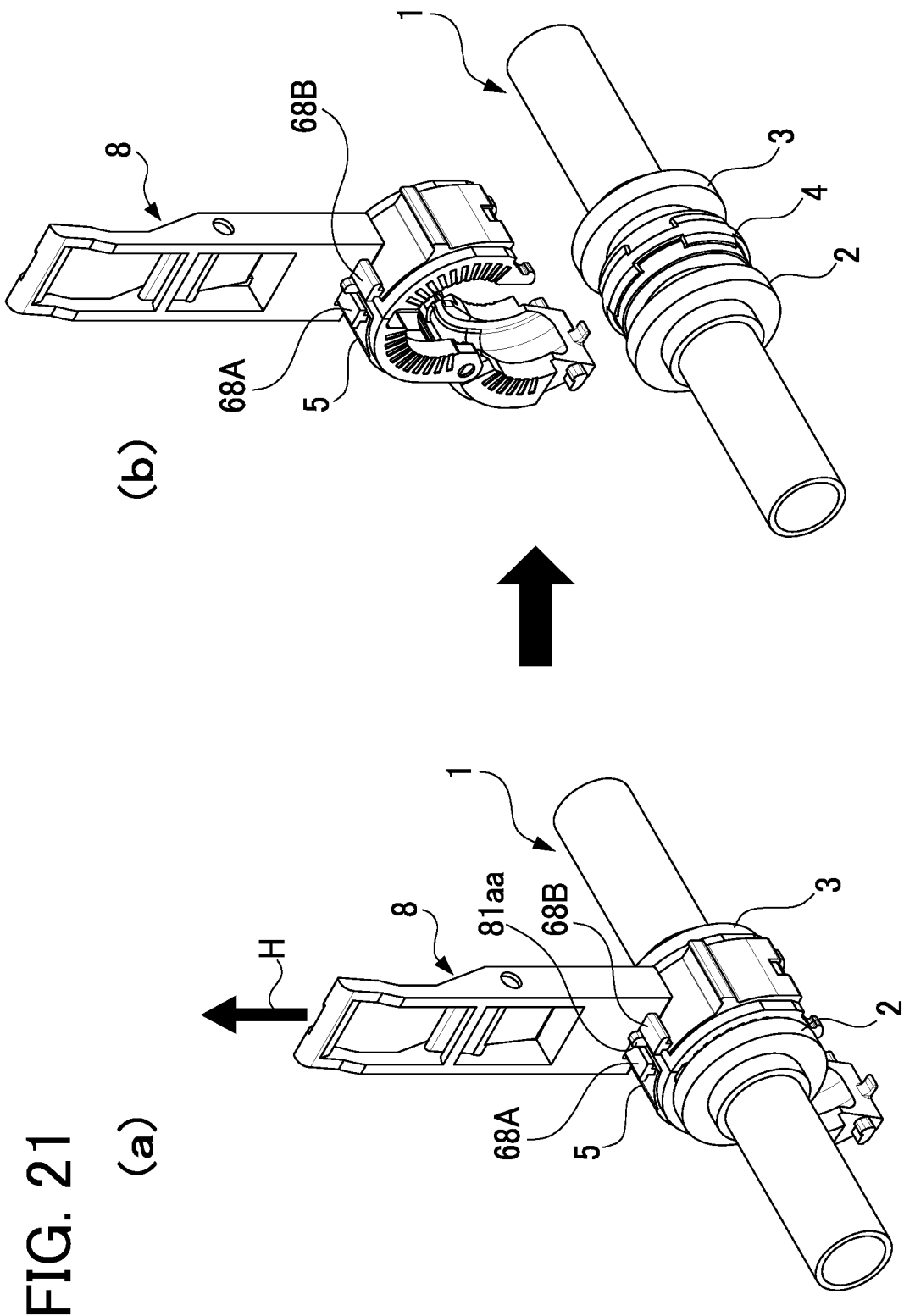
FIG. 21 illustrates how to demount the coupling member with the jig, (a) showing that the jig is attached to the coupling member to demount the coupling member, and (b) showing that the jig is lifted up and the coupling member is demounted.
Figure 22:
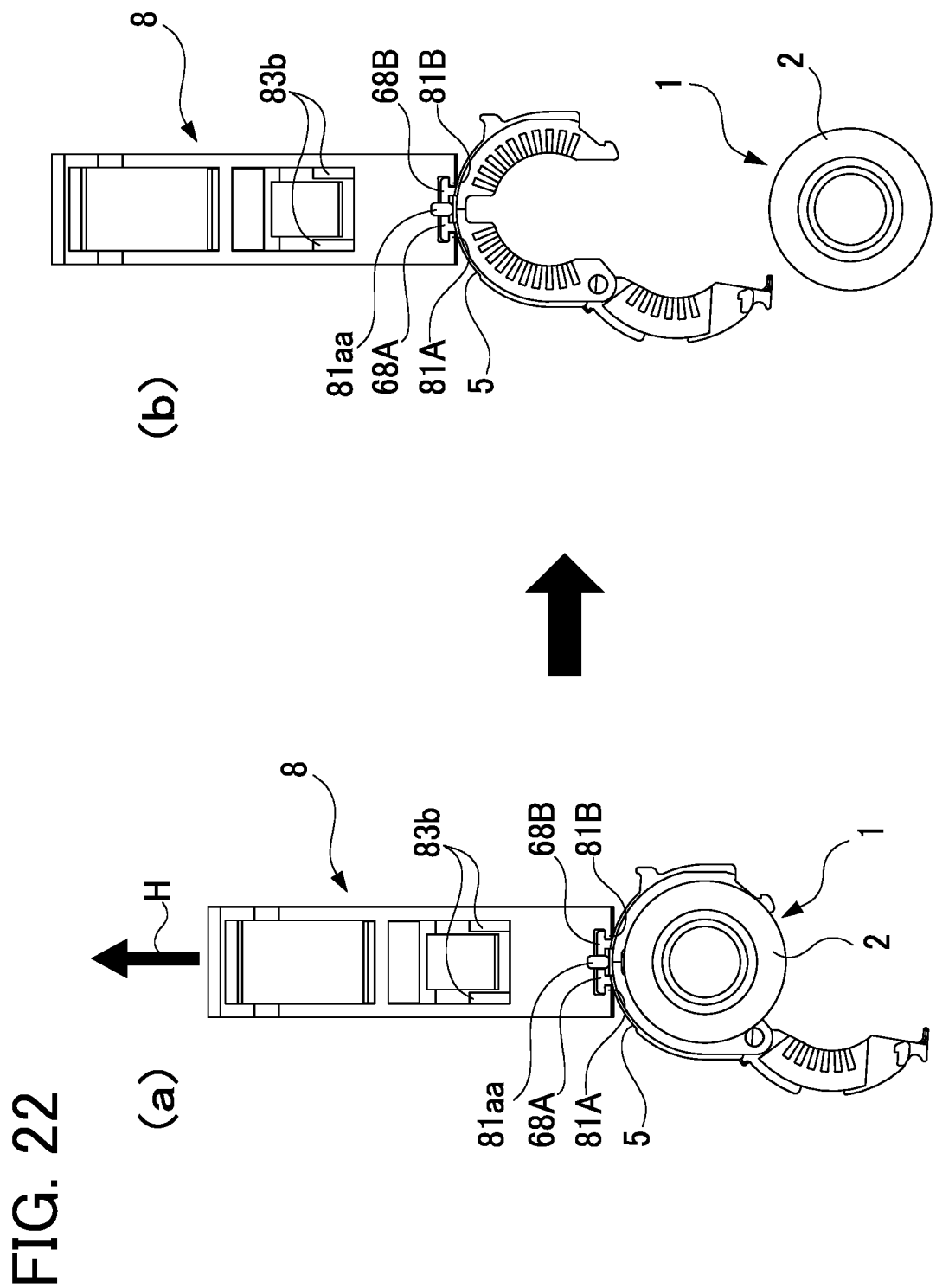
FIG. 22 illustrates how to demount the coupling member with the jig, (a) showing that the jig is attached to the coupling member to demount the coupling member, and (b) showing that the jig is lifted up and the coupling member is demounted.

Demounting of the coupling member 5 will be explained below with reference to FIGS. 21 and 22. FIG. 21 illustrates how to demount the coupling member 5 with the jig 8, (a) showing that the jig 8 is attached to the coupling member 5 to demount the coupling member 5, and (b) showing that the jig 8 is lifted up and the coupling member 5 is demounted. FIG. 22 illustrates how to demount the coupling member 5 with the jig 8, (a) showing that the jig 8 is attached to the coupling member 5 to demount the coupling member 5, and (b) showing that the jig 8 is lifted up and the coupling member 5 is demounted.

For demounting the coupling member 5, the jig 8 is used. Specifically, as shown in FIG. 21(a) and FIG. 22(a), the rib 81aa of the jig 8 is inserted between the pair of attachment locking parts 68A and 68B of the coupling member 5. The pair of locked parts 81A and 81B of the jig 8 is slid on the attachment locking parts 68A and 68B of the coupling member 5 until the stopper 81bb of the jig 8 comes into contact with the ends of the attachment locking parts 68A and 68B. After the locked parts 81A and 81B are firmly engaged with the attachment locking parts 68A and 68B, the jig 8 is pulled up in a direction indicated with an arrow H, releasing engagement between the first locking parts 64 and the first locked part 75 of the coupling member 5. The coupling member 5 is accordingly demounted from the first fluid device 2 and the second fluid device 3.

Moreover, the coupling member 5 can be mounted by the steps in reverse order from the aforementioned steps.

Figure 36:
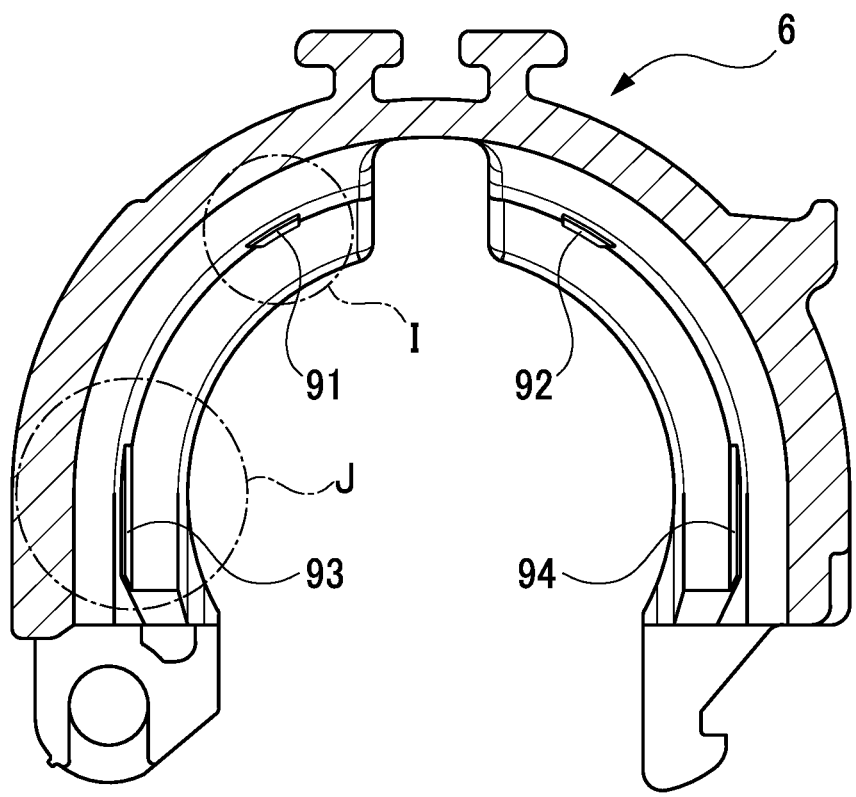
FIG. 36 is a cross-sectional view of a first coupling segment in a second embodiment.
Figure 37:
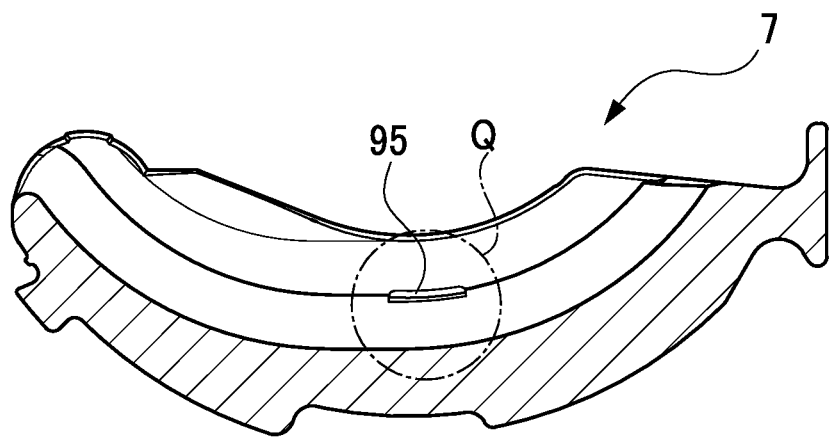
FIG. 37 is a cross-sectional view of a second coupling segment in the second embodiment.
Figure 38:
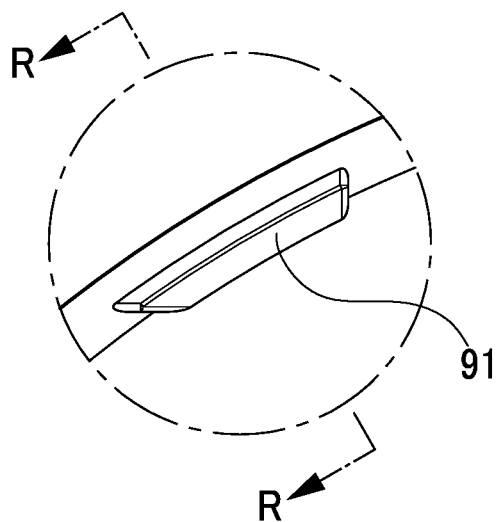
FIG. 38 is an enlarged view of a part I in FIG. 36.
Figure 39:
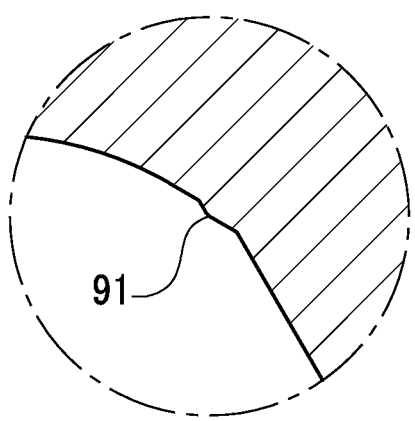
FIG. 39 is a cross-sectional view taken along a line R-R in FIG. 38.
Figure 40:
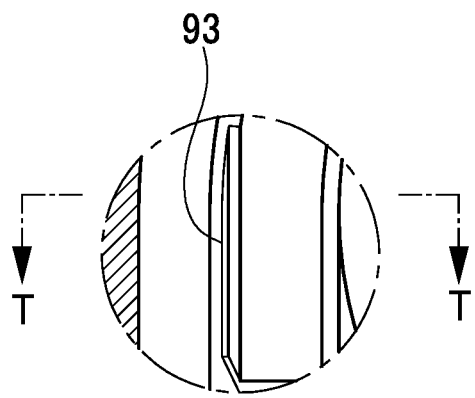
FIG. 40 is an enlarged view of a part J in FIG. 36.
Figure 41:
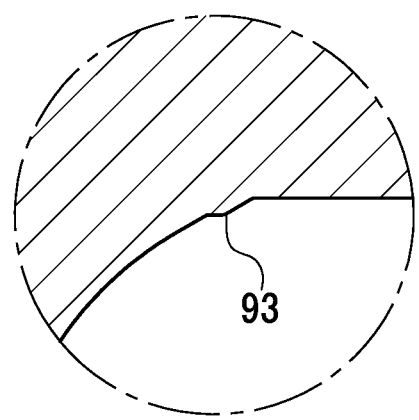
FIG. 41 is a cross-sectional view taken along a line T-T in FIG. 40.
Figure 42:
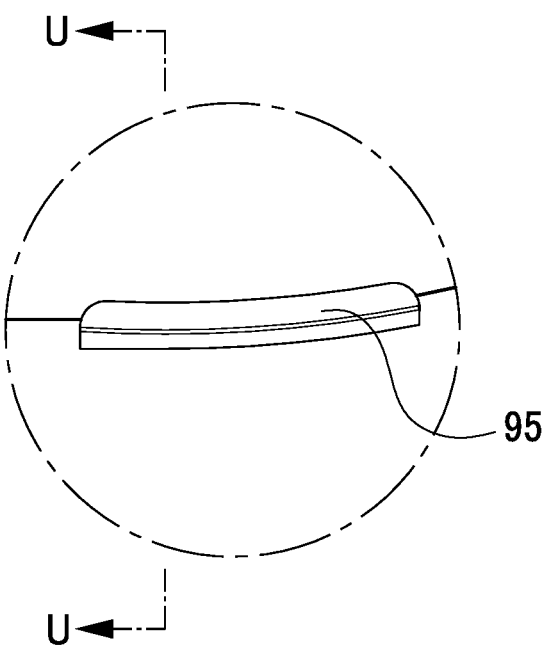
FIG. 42 is an enlarged view of a part Q in FIG. 37.
Figure 43:
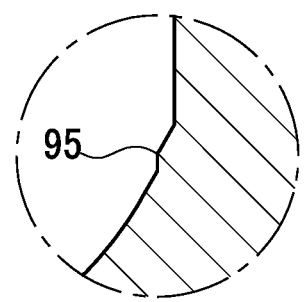
FIG. 43 is a cross-sectional view taken along a line U-U in FIG. 42.

A second embodiment of the coupling member 5 will be shown in FIGS. 36 to 43. Specifically, FIG. 36 is a cross-sectional view of the first coupling segment 6. FIG. 37 is a cross-sectional view of the second coupling segment 7. FIG. 38 is an enlarged view of a part I in FIG. 36. FIG. 39 is a cross-sectional view taken along a line R-R in FIG. 38. FIG. 40 is an enlarged view of a part J in FIG. 36. FIG. 41 is a cross-sectional view taken along a line T-T in FIG. 40. FIG. 42 is an enlarged view of a part Q in FIG. 37. FIG. 43 is a cross-sectional view taken along a line U-U in FIG. 42.

As shown in FIG. 36, the first coupling segment 6 has an inner circumferential surface formed with a pair of bosses 91, a pair of bosses 92, a pair of bosses 93, and a pair of bosses 94 at corresponding positions to face the connection-side taper surface 26 which is an outer circumferential portion of the flange part 25 of the first connection part 21 and the connection-side taper surface 36 which is an outer circumferential portion of the flange part 35 of the second connection part 31.

The second coupling segment 7 has an inner circumferential surface formed with a pair of bosses 95 at positions to face the connection-side taper surface 26 of the flange part 25 and the connection-side taper surface 36 of the flange part 35.

The shape of each of the bosses 91 is illustrated in an enlarged view in FIGS. 38 and 39. Each boss 91 has a predetermined length in a circumferential direction along the inner circumferential surface of the first coupling segment 6 and protrudes inward in a radial direction of the coupling member 5. The pair of bosses 92 is identical in shape to the pair of bosses 91.

The shape of each of the bosses 93 is illustrated in an enlarged view in FIGS. 40 and 41. Each boss 93 has a predetermined length in the circumferential direction along the inner circumferential surface of the first coupling segment 6 and protrudes inward in the radial direction of the coupling member 5. The pair of bosses 94 is identical in shape to the pair of bosses 93.

The shape of each of the bosses 95 is illustrated in an enlarged view in FIGS. 42 and 43. Each boss 95 has a predetermined length in the circumferential direction along the inner circumferential surface of the second coupling segment 7 and protrudes inward in the radial direction of the coupling member 5.

Next, operations and advantageous effects of each pair of bosses 91, 92, 93, 94, and 95 will be described below.

As shown in FIG. 16, the distal end portion 64aa of each first locking part 64 of the first coupling segment 6 and the distal end portion 75aa of each first locked part 75 of the second coupling segment 7 normally contact and engage with each other. However, a gap may occur between the contact faces of the distal end portion 64aa and the distal end portion 75aa by a tolerance of the first coupling segment 6 and the second coupling segment 7, making it impossible to tightly engage with each other. This state with the gap does not particularly affect the sealing strength, but such an appearance may give a user an impression that the mounting operation of the coupling member 5 has not been completed.

In the present embodiment, therefore, the pair of bosses 91, the pair of bosses 92, the pair of bosses 93, and the pair of bosses 94 are formed in the inner circumferential surface of the first coupling segment 6, at appropriate positions to face the connection-side taper surface 26 which is the outer circumferential portion of the flange part 25 and the connection-side taper surface 36 which is the outer circumferential portion of the flange part 35. Furthermore, the pair of bosses 95 is formed in the inner circumferential surface of the second coupling segment 7, at positions to face the connection-side taper surface 26 of the flange part 25 and the connection-side taper surface 36 of the flange part 35. Therefore, the first coupling segment 6 and the second coupling segment 7 are pressed outward in the radial direction, removing the gap between the contact faces of the distal end portion 64aa and the distal end portion 75aa and thus enabling reliable engagement therebetween.

In the present embodiment, five pairs of bosses are formed, but the bosses may alternatively be formed in two pairs, three pairs, four pairs, six pairs, or seven pairs.

According to the fluid-device connecting structure 1 in the present embodiment described above, the coupling member 5 is to be used in the fluid-device connecting structure 1 including the first fluid device 2 having the first connection part 21, the second fluid device 3 having the second connection part 31, the annular seal member 4 for connecting the first connection part 21 and the second connection part 31, and the coupling member 5 for maintaining the first connection part 21 and the second connection part 31 in the connected state. The coupling member 5 is provided with the first coupling segment 6 and the second coupling segment 7. The first coupling segment 6 and the second coupling segment 7 respectively include the first hinge part 63 and the hinge part 73 at one end (first end) in the circumferential direction of the coupling segments 6 and 7. The first connection part 21 and the second connection part 31 each have a round, or cylindrical, outer shape. The first coupling segment 6 has a U-like shape having the opening 6a and is engageable with the second coupling segment 7 at points spaced more than 180 degrees of the entire circumference of the first connection part 21 and the second connection part 31. Since the engagement portions are not provided outside in the radial direction of the coupling member, the coupling member itself is compact in size. Even in a narrow space where a number of the fluid devices are arranged in parallel, in which when the tubular parts 28 and 38 or the wall surfaces are located adjacently, the coupling member can be installed with good workability.

In the aforementioned coupling member 5, the dimension N of the opening 6a is smaller than the diameter P of each of the tubular part 28 of the first connection part 21 and the tubular part 38 of the second connection part 31. The first coupling segment 6 is deformable so as to expand or open up the opening 6a by just a distance corresponding to the difference M between the diameter P of each tubular part 28 or 38 and the dimension N of the opening 6a. Thus, the first coupling segment 6 expanding outward by a constant length can be temporarily fixed on the first connection part 21 and the second connection part 31. Accordingly, even when own weight or external pressure acts on the first coupling segment 6 after mounted on the connection parts 21 and 31, the first coupling segment 6 is less likely to come off and can provide good workability.

In the aforementioned coupling member 5, the first coupling segment 6 includes the thin-wall portion 69 having the cutout 69*a*. In the course of mounting the first coupling segment 6 onto the first connection part 21 and the second connection part 31, the thin-wall portion 69 is elastically deformed with adequate strength, thereby opening up the opening 6*a*. After mounted, the opening 6*a* constricts. Accordingly, the first coupling segment 6 can be mounted with an appropriate mounting force so that an operator has a feeling of adequately mounting. Thus, the first coupling segment 6 mounted on the connection parts 21 and 31 is less likely to come off therefrom and can provide good workability.

In the aforementioned coupling member 5, the rotational joint parts of the first coupling segment 6 and the second coupling segment 7 are respectively formed with the first resistive projections 6*d* and the second resistive projections 7*b* to prevent own-weight rotation. The second coupling segment 7 has the inner circumferential surface which will contact with the first connection part 21 and the second connection part 31 and the inner circumferential surface includes the chamfered portions 7*c* which will not contact with the first connection part 21 and the second connection part 31. Accordingly, as the first coupling segment 6 and the second coupling segment 7 come close to each other, the first resistive projections 6*d* of the first coupling segment 6 and the second resistive projections 7*b* of the second coupling segment 7 contact with and rub against each other, generating a frictional force, so that the first coupling segment 6 and the second coupling segment 7 can be temporarily fixed. Thus, good workability can be achieved. Furthermore, the second coupling segment 7 has a rotatable range in which the second coupling segment 7 can freely rotate without interference with the first connection part 21 and the second connection part 31 and the frictional resistance is generated. Thus, after the first coupling segment 6 is mounted on the first connection part 21 and the second connection part 31 and before the second coupling segment 7 is engaged with the first coupling segment 6, the second coupling segment 7 can be temporarily fixed in a position enabling easy work with good workability.

In the aforementioned coupling member 5, the first coupling segment 6 includes, on its outer periphery, the attachment locking parts 68A and 68B each having a T-like or L-like shape. Accordingly, these attachment locking parts 68A and 68B can be pinched. Further, the jig 8 can be attached to and pushed against the attachment locking parts 68A and 68B or pulled up. This enables easy mounting or demounting of the coupling member 5 with good workability.

In the aforementioned coupling member 5, the second coupling segment 7 includes, on its outer periphery, the rotation inducing part 74. Accordingly, the second coupling segment 7 can be rotated simply by application of load on the rotation inducing part 74 from the same direction as the direction of mounting the coupling member 5 onto the first connection part 21 and the second connection part 31. This workability is good.

According to the aforementioned configuration, the following operations and advantageous effects can be achieved. Specifically, as shown in FIG. 16, the distal end portion 64*aa* of the first locking part 64 of the first coupling segment 6 and the distal end portion 75*aa* of the first locked part 75 of the second coupling segment 7 are normally in contact and engagement relation. However, a gap may be generated between the contact faces of the distal end portion 64*aa* and the distal end portion 75*aa* by a tolerance of the first coupling segment 6 and the second coupling segment 7, making it impossible to tightly engage the distal end portions 64*aa* and the 75*aa* with each other. This state with the gap does not particularly affect the sealing strength, but such an appearance may give a user an impression that the work of attaching the coupling member 5 has not been finished. The first coupling segment 6 is formed, on its surface, with the pairs of bosses 91, 92, 93, and 94 at positions to face the connection-side taper surface 26 of the flange part 25 and to face the connection-side taper surface 36 of the flange part 35. Furthermore, the second coupling segment 7 is formed, on its surface, with the pair of bosses 95 at positions to face the connection-side taper surface 26 of the flange part 25 and the connection-side taper surface 36 of the flange part 35. Accordingly, the first coupling segment 6 and the second coupling segment 7 are pressed outward in the radial direction while the bosses 91, 92, 93, 94, and 95 and the connection-side taper surfaces 26 and 36 are mutually deformed, removing the gap between the distal end portion 64*aa* and the distal end portion 75*aa*. This enables reliable engagement therebetween.

In the aforementioned coupling member 5, the other end (the second end) of the first coupling segment 6 in its circumferential direction is provided with the first locking parts 64, and the other end (the second end) of the second coupling segment 7 is provided with the first locked parts 75 with which the first locking parts 64 are engageable. The coupling member 5 is placed in the first lock position in which the first locking parts 64 and the first locked parts 75 engage with each other. The coupling member 5 in the second lock position is closer to the annular seal member 4 than in the first lock position. Furthermore, the first lock position corresponds to a normal use state. The second lock position corresponds to a retightened state. In case where the first connection part 21 and the second connection part 31 are exposed alternately to for example abnormally high temperature chemical liquid and abnormally low temperature pure water for a long term, leading to decreased sealing strength and thus causing leakage of fluid, the coupling member 5 is changed from the first lock position to the second lock position where the coupling member 5 is closer toward the annular seal member 4 than in the first lock position. This enhances the strength of connecting the first connection part 21 and the second connection part 31 to quickly address the occurrence of liquid leakage.

In the fluid-device connecting jig 8 to be used for the aforementioned coupling member 5, the first coupling segment 6 is provided, on its outer peripheral surface, with the second jig-catching part 66*c*, and the second coupling segment 7 is provided, on its outer peripheral surface, with the first jig-catching part 77. The connecting jig 8 includes the common hooking part 82*a* engageable with the first jig-catching part 77, and the first-lock-position hooking part 84*a* and the second-lock-position hooking part 84*b* each engageable with the second jig-catching part 66*c*. Accordingly, with the use of the connecting jig 8, the first coupling segment 6 and the second coupling segment 7 can be placed in a connection state changeable between the first lock position and the second lock position.

The fluid-device connecting jig 8 to be used for the aforementioned coupling member 5 is inserted from the same direction as the direction of mounting the coupling member 5 onto the first connection part 21 and the connection part 31 to engage the first coupling segment 6 and the second coupling segment 7 with each other. This configuration enables an one-way work, which can be easily performed with good workability even in a narrow space where many fluid devices are installed in parallel.

In the fluid-device connecting jig 8 to be used for the aforementioned coupling member 5, when the jig 8 remains attached to the coupling member 5, the presence of the jig 8 indicates the retightened state of the coupling member 5. Accordingly, when the jig 8 remains attached to the coupling member 5, the retightened state of the coupling member 5 can be easily ascertained from its appearance. This enables an operator to find and address a fluid device with the coupling member 5 in a retightened state at a glance during maintenance with good workability.

The foregoing embodiments are mere examples and give no limitation to the present disclosure. The present disclosure may be embodied in other specific forms without departing from the essential characteristics thereof.

For instance, in the aforementioned embodiment, the T-shaped attachment locking parts 68 are provided on the outer periphery of the first coupling segment 6. As an alternative, each attachment locking part 68 may be designed in an L-like shape or only a single attachment locking part may be provided as long as the attachment locking part(s) 68 allows the jig 8 to engage therewith.

For instance, in the aforementioned embodiment, the second coupling segment 7 is formed with the chamfered portions 7c in the inner circumferential surface of the second coupling segment 7 which will contact with the first connection part 21 and the second connection part 31. As an alternative, instead of the chamfered portions, any retracted portion may be adopted as long as it does not contact with the first connection part and the second connection part.

For example, the material of the jig 8 may be selected from not only general resin but also fluorocarbon resin such as PTF or PTFE, or metal.

For instance, the frictional resistance may be generated not only by contact between the first resistive projections 6d and the second resistive projections 7b but also by contact between the contact surfaces of the first hinge parts 63 and the second hinge part 73, the surfaces being perpendicular to the axis direction of the flow passages 29 and 39.

In the aforementioned embodiment, the pairs of bosses 91, 92, 93, 94, and 95 are correspondingly formed in the first coupling segment 6 and the second coupling segment 7, at positions to face the connection-side taper surfaces 26 and 36 of the flange parts 25 and 35. As an alternative, the bosses 91, 92, 93, 94, and 95 may be formed at positions to face outer circumferential surfaces 25a and 35a (on both sides of the retaining portion 45 in FIG. 24) which are outer circumferential portions of the flange parts 25 and 35.

In the aforementioned embodiment, the bosses 91, 92, 93, 94, and 95 are provided in each pair located at the same position in a circumferential direction, but may be provided in staggered positions in the circumferential direction.

In the aforementioned embodiment, the bosses 91, 92, 93, 94, and 95 and the connection-side taper surfaces 26 and 36 are mutually deformable. Further, the bosses 91, 92, 93, 94, and 95 may be designed to be relatively high in rigidity to be smaller in deformable amount than the connection-side taper surfaces 26 and 36.

REFERENCE SIGNS LIST

1 Fluid-device connecting structure
2 First fluid device
3 Second fluid device
4 Annular seal member
5 Coupling member
6 First coupling segment
6a Opening
6d First resistive projection
7 Second coupling segment
7b Second resistive projection
7c Chamfered portion
8 Fluid-device connecting jig
21 First connection part
31 Second connection part
64 First locking part
66a Recess
69 Thin-wall portion
75 First locked part
76 Claw
82a Common hooking part
84a First-lock-position hooking part
84b Second-lock-position hooking part
91, 92, 93, 94, 95 Pair of bosses

What is claimed is:

1. A coupling member to be used for a fluid-device connecting structure comprising:
   a first fluid device having a first connection part;
   a second fluid device having a second connection part;
   an annular seal member placed between the first connection part and the second connection part; and
   the coupling member for coupling the first connection part and the second connection part through the annular seal member, wherein:
   the coupling member includes a single-piece first coupling segment and a single-piece second coupling segment, each having a rotational joint part at a first end,
   the first connection part and the second connection part each have a cylindrical outer shape,
   the first coupling segment and the second coupling segment each having a protruding portion engageable with the first connection part and the second connection part respectively,
   the first coupling segment has a U-like shape having an opening and is engageable with the second coupling segment at points spaced more than 180 degrees of an entire circumference of each of the first connection part and the second connection part,
   the opening has a dimension smaller than a diameter of a tubular part of each of the first connection part and the second connection part, and
   the first coupling segment is provided with a thin wall portion that is opposite the opening and that is radially thinner than other adjacent portions of the first coupling segment so as to be configured to diametrically expand the first coupling segment outward by a distance corresponding to a difference between the dimension of the opening and the diameter of the tubular part of each of the first connection part and the second connection part.

2. The coupling member according to claim 1, wherein the first coupling segment includes the thin-wall portion having a cutout.

3. The coupling member according to claim 1, wherein each of the rotary joint part of the first coupling segment and the rotary joint part of the second coupling segment is provided with a resistance generating part to prevent own-weight rotation, and
   the second coupling segment includes an inner circumferential surface which contacts with the first connection part and the second connection part, the inner circumferential surface including a portion which will not contact with the first connection part and the second connection part.

4. The coupling member according to claim 1, wherein the first coupling segment is provided, on its outer periphery, with an attachment locking part having a T-like shape or L-like shape.

5. The coupling member according to claim 1, wherein the second coupling segment is provided, on its outer periphery, with a rotation inducing part.

6. The coupling member according to claim 1, wherein the first coupling segment is provided with bosses at positions to face an outer circumferential portion of the first connection part and to face an outer circumferential portion of the second connection part.

7. The coupling member according to claim 6, wherein the second coupling segment is provided with bosses at positions to face the outer circumferential portion of the first connection part and to face the outer circumferential portion of the second connection part.

8. The coupling member according to claim 1, wherein
the first coupling segment is provided, at a second end, with a first locking part,
the second coupling segment is provided, at a second end, with a first locked part with which the first locking part is engageable,
the coupling member can be positioned in a first lock position where the first locking part and the first locked part engage with each other, and
the coupling member can be changed from the first lock position to a second lock position where the coupling member is closer toward the annular seal member than in the first lock position.

9. The coupling member according to claim 8, wherein
the first lock position corresponds to a normal use state of the coupling member, and
the second lock position corresponds to a retightened state of the coupling member.

10. The coupling member according to claim 1, wherein the opening has a dimension configured to be larger than the diameter of the tubular part of each of the first connection part and the second connection part, at least when diametrically expanded.

11. The coupling member according to claim 1, wherein the first coupling segment includes an attachment locking part on an outer peripheral surface at a top opposite to the opening.

12. A fluid-device connecting jig used with the coupling member according to claim 1, wherein
the first coupling segment is provided, on its outer peripheral surface, with a second jig-catching part,
the second coupling segment is provided, on its outer peripheral surface, with a first jig-catching part, and
the fluid-device connecting jig includes a common hooking part engages with the first jig-catching part, and a first-lock-position hooking part and a second-lock-position hooking part each engageable with the second jig-catching part.

13. A fluid-device connecting jig used with the coupling member according to claim 1, wherein the fluid-device connecting jig is inserted from same direction as a direction of mounting the coupling member onto the first connection part and the second connection part to engage the first coupling segment and the second coupling segment.

14. A fluid-device connecting jig used with the coupling member according to claim 1, wherein when the fluid-device connecting jig remains attached to the coupling member, the fluid-device connecting jig indicates a retightened state of the coupling member.

15. A fluid-device connecting structure including the coupling member according to claim 1.

* * * * *